(12) United States Patent
Juhlin

(10) Patent No.: US 9,992,401 B2
(45) Date of Patent: Jun. 5, 2018

(54) CONFIGURING A DEVICE IN A NETWORK

(71) Applicant: Axis AB, Lund (SE)

(72) Inventor: Fred Juhlin, Genarp (SE)

(73) Assignee: Axis AB, Lund (SE)

( * ) Notice: Subject to any disclaimer, the term of this patent is extended or adjusted under 35 U.S.C. 154(b) by 700 days.

(21) Appl. No.: 14/532,277

(22) Filed: Nov. 4, 2014

(65) Prior Publication Data

US 2016/0127633 A1 May 5, 2016

(51) Int. Cl.
| | | |
|---|---|---|
| *H04N 7/18* | (2006.01) | |
| *H04N 5/232* | (2006.01) | |
| *G01B 11/00* | (2006.01) | |
| *H04L 29/08* | (2006.01) | |

(52) U.S. Cl.
CPC ......... *H04N 5/23206* (2013.01); *G01B 11/00* (2013.01); *H04L 67/025* (2013.01); *H04L 67/125* (2013.01); *H04N 5/23293* (2013.01)

(58) Field of Classification Search
CPC ............ H04N 5/23206; H04N 5/23293; H04L 67/125; H04L 67/025; G01B 11/00
See application file for complete search history.

(56) References Cited

U.S. PATENT DOCUMENTS

| | | | | |
|---|---|---|---|---|
| 2001/0038392 A1* | 11/2001 | Humpleman | ....... | H04L 12/2803 715/733 |
| 2007/0156854 A1 | 7/2007 | Wei et al. | | |
| 2008/0077425 A1 | 3/2008 | Johnson et al. | | |
| 2014/0074979 A1 | 3/2014 | Singh et al. | | |
| 2015/0348382 A1* | 12/2015 | Michihata | .......... | G06K 9/00771 382/103 |

FOREIGN PATENT DOCUMENTS

| | | | | |
|---|---|---|---|---|
| WO | WO 02/082302 | | 10/2002 | |
| WO | WO 02082302 A1 * | | 10/2002 | ............. G05B 15/02 |

OTHER PUBLICATIONS

Extended European Search Report dated Mar. 2, 2015 for corresponding European Application No. 14196701.8.

* cited by examiner

*Primary Examiner* — Tat C Chio
(74) *Attorney, Agent, or Firm* — Snyder, Clark, Lesch & Chung, LLP

(57) ABSTRACT

A method is disclose that may include sending, from a management device to a monitoring device, a request for a network address associated with a configuration setting for the service provided by the monitoring device that generated the event message. The method may include receiving, in the management device and from the monitoring device, the network address. The method may also include requesting a resource identified by the network address, wherein the resource includes a web page hosted by a web server and displaying the web page to a user, wherein the web page is configured to enable the user to alter the configuration setting of the service that generated the event. The method may also include transmitting the altered configuration setting to the web server, wherein the web server initiates an update of the configuration setting of the service based on the altered configuration setting.

20 Claims, 17 Drawing Sheets

SERVICE TABLE 464

| | SERVICE 480 | VENDOR 482 | NETWORK ADDRESS 484 | EVENT MESSAGE 486 |
|---|---|---|---|---|
| 490 | CAMERA (DEFAULT) | ACME 1.0 | 10.1.1.1/admin | VIDEO START VIDEO STOP |
| 492 | MOTION DETECTION (DEFAULT) | ACME V1.2 | 10.1.1.1/motion | MOTION DETECTED |
| 494 | MOTION DETECTION (ADD-ON) | SENTRY V3.0 | 10.1.1.1/add-on/sentry | MOTION DETECTED |
| 496 | PEOPLE COUNTER (ADD-ON) | PCC V2.0 | 10.1.1.1/add-on/counter-config | MAX OCCUPANCY |
| 498 | PEOPLE COUNTER (ADD-ON) | PCC V2.0 | 10.1.1.1/add-on/counter-stats | |

FIG. 4C

AGGREGATE TABLE 574

| | DEVICE 688 | SERVICE 680 | VENDOR 682 | NETWORK ADDRESS 684 | EVENT MESSAGE 686 |
|---|---|---|---|---|---|
| 660 | CAMERA 602 | CAMERA (DEFAULT) | ACME 1.0 | 10.1.1.1/admin | VIDEO START VIDEO STOP |
| 662 | CAMERA 602 | MOTION DETECTION | ACME V1.2 | 10.1.1.1/motion | MOTION DETECTED |
| 664 | CAMERA 602 | MOTION DETECTION (ADD-ON) | SENTRY V3.0 | 10.1.1.1/add-on/sentry | MOTION DETECTED |
| 666 | CAMERA 602 | PEOPLE COUNTER (ADD-ON) | PCC V2.0 | 10.1.1.1/add-on/counter-config | MAX OCCUPANCY |
| 668 | CAMERA 602 | PEOPLE COUNTER (ADD-ON) | PCC V2.0 | 10.1.1.1/add-on/counter-stats | |
| 670 | CAMERA 604 | PEOPLE COUNTER (ADD-ON) | PCC V2.0 | 10.1.1.2/add-on/counter-config | MAX OCCUPANCY |
| 672 | CAMERA 604 | PEOPLE COUNTER (ADD-ON) | PCC V2.0 | 10.1.1.2/add-on/counter-stats | |

DISPLAY 638

ALERT!! MOTION AT CAMERA 602!!

DISPLAY 638

ACME STATION – CONFIGURE SERVICES

DEVICE SELECTED: CAMERA 602

SERVICES WITH ACME STATION INTEGRATION

| SERVICE | VENDOR |
|---------|--------|
| CAMERA | ACME 1.0 |
| MOTION | ACME V1.2 |

( settings )
( [disabled] )

SERVICES WITH DEVICE-HOSTED SETTINGS (NOT ACME)

| SERVICE | VENDOR |
|---------|--------|
| MOTION DETECTION | SENTRY V3.0 |
| PEOPLE COUNTER | PCC V2.0 |
| PEOPLE COUNTER | PCC V2.0 |

904 ( settings ) — 10.1.1.1/add-on/sentry
( settings ) — 902
( stats )

FIG. 9B

CONFIGURING A DEVICE IN A NETWORK

BACKGROUND INFORMATION

As cameras and other monitoring devices become less expensive, these devices are proliferating. As these devices proliferate, "stations" or "hubs" monitor the status of these devices. For example, an operator may sit at a "camera station" to monitor a group of cameras. The stations and/or hubs may receive event messages from the monitoring devices, and act on those event messages. For example, a station may record video when a motion detected event is issued by a camera. Users may wish to configure the monitoring devices from the station or hub.

SUMMARY

A method is disclosed below. The method may include receiving an event message in a management device, wherein the event message was generated by a service in a monitoring device. The method may include sending, from the management device to the monitoring device, a request for a network address associated with a configuration setting for the service provided by the monitoring device that generated the event message. The method may include receiving, in the management device and from the monitoring device, the network address. The method may include requesting a resource identified by the network address, wherein the resource includes a web page hosted by a web server. The method may include displaying the web page to a user, wherein the web page is configured to enable the user to alter the configuration setting of the service that generated the event. The method may include transmitting the altered configuration setting to the web server, wherein the web server initiates an update of the configuration setting of the service based on the altered configuration setting.

The method may also include sending, from the management device to the monitoring device, a request for a list of services provided by the monitoring device to other devices; and receiving, in the management device from the monitoring device, the list of services provided by the monitoring device to other devices.

In the method, displaying the web page to the user may include loading the web page through an intermediate server acting as a proxy device; and rendering the web page on a display of the management device.

The method may include receiving a selection, from the list of services provided by the monitoring device, the service that generated the event in the monitoring device.

The monitoring device may host the resource identified by the network address. The method may include updating the configuration setting of the service based on the altered configuration setting through an application program interface (API) provided by the service on the device.

In one embodiment, the monitoring device may not host the resource identified by the network address. The method may include updating the configuration setting of the service based on the altered configuration setting through an application program interface (API) provided by the service on the device.

Sending, from the management device to the monitoring device, the request for the network address may include sending, from the management device to the monitoring device, a request for a list of services provided by the monitoring device to other devices. Receiving the network address may include receiving, in the management device from the monitoring device, the list of services provided by the monitoring device and corresponding network addresses associated with configuration setting for one or more services in the list of services.

Receiving the network address may include receiving, from the monitoring device in the management device, the list of services provided by the monitoring device and corresponding identification of event messages associated with one or more services in the list of services.

A system is disclosed. The system may include a management device, which may include a receiver to receive receiving an event message in the management device, wherein the event message was generated by a service in a monitoring device. The management device may include a transmitter to send, from the management device to the monitoring device, a request for a network address associated with a configuration setting for the service provided by the monitoring device that generated the event message. The receiver may be configured to receive, from the monitoring device, the network address. The transmitter may be configured to request a resource identified by the network address, wherein the resource includes a web page hosted by a web server. The management device may include a display to show the web page to a user, wherein the web page is configured to enable the user to alter the configuration setting of the service that generated the event. The transmitter is configured to send the altered configuration setting to the web server, wherein the web server initiates an update of the configuration setting of the service based on the altered configuration setting.

The transmitter may be configured to send, to the monitoring device, a request for a list of services provided by the monitoring device to other devices. The receiver may be configured to receive, from the monitoring device, the list of services provided by the monitoring device to other devices.

The system may include a proxy device, wherein the management device is configured to load the web page through an intermediate server acting as a proxy device; and render the web page on the display.

The monitoring device may include an input device to receive a selection, from the list of services provided by the monitoring device, the service that generated the event in the monitoring device.

The system may include the monitoring device. The monitoring device may host the resource identified by the network address and sends the altered configuration setting to the monitoring device through an application program interface (API) provided by the service on the monitoring device.

The system may include a server. The server may host the resource identified by the network address and sends the altered configuration setting to the monitoring device through an application program interface (API) provided by the service on the monitoring device.

The transmitter may be configured to send, to the monitoring device, a request for a list of services provided by the monitoring device to other devices. The receiver may be configured to receive the list of services provided by the monitoring device and corresponding network addresses associated with configuration setting for one or more services in the list of services.

Other embodiments are described below. That is, the embodiments described above are only provided as examples.

BRIEF DESCRIPTION OF THE DRAWINGS

FIG. 4C illustrates the service table shown in FIG. 4B;

FIG. 6B illustrates an exemplary aggregate table of FIG. 5B;

FIGS. 9A through 9D illustrate exemplary user interfaces for configuring devices and viewing information in the network of the environment of FIG. 6A.

DETAILED DESCRIPTION OF EMBODIMENTS

Figure 1:
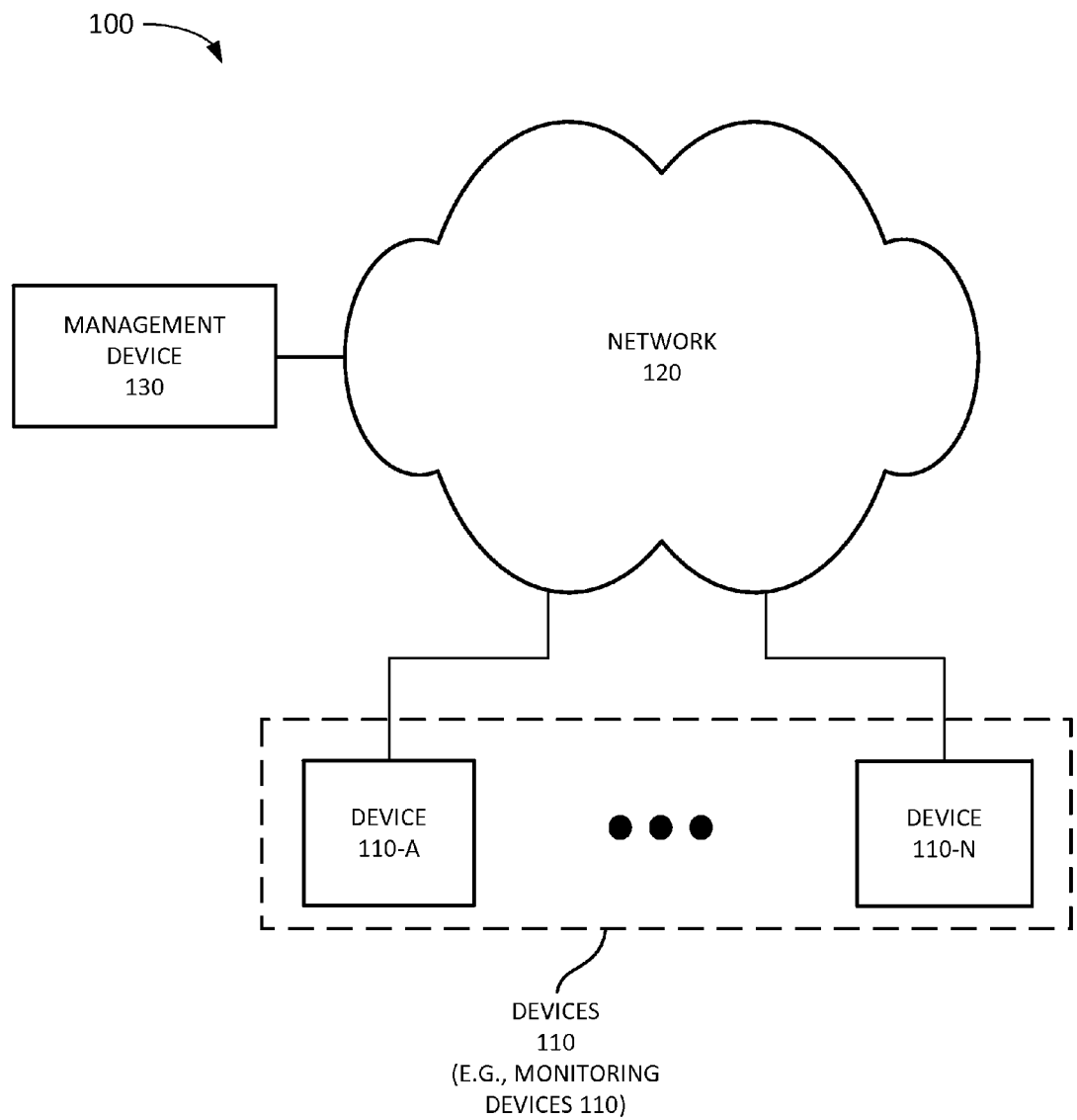
FIG. 1 is a block diagram illustrating an exemplary environment according to one embodiment.

The following detailed description refers to the accompanying drawings. The same reference numbers in different drawings identify the same or similar elements.

As cameras and other monitoring devices become less expensive, these devices are proliferating. As these devices proliferate, "stations" or "hubs" monitor the status of these monitoring devices. For example, an operator may sit at a "camera station" to monitor a group of cameras. The stations and/or hubs may receive event messages from the monitoring devices, and act on those event messages. For example, a station may record video when a motion detected event is issued by a camera. As noted above, users may wish to configure the monitoring devices from the station or hub.

As these monitoring devices proliferate, however, the number of manufacturers, platforms, and standards, make interoperability difficult. For example, for an operator to configure a monitoring device from her station, the station software potentially needs to be updated for each device, and for each service provided by each device. Further, the station software potentially would need to be updated for each update of each monitoring device, and for each update of each service provided by each device. In such a situation, the vendor that maintains the station software may not have the resources to update the station software for all the potential services on these monitoring devices (e.g., from different vendors). Even if the vendor of the station software did update its software to interact with another vendor's service software in a monitoring device, the vendor of the service software may not be satisfied with the station software implementation—making nobody happy, and the vendor of the service software may feel constrained when updating its software (e.g., so as not to break compatibility with the station software).

While monitoring devices may be configured directly by logging into the device (e.g., using a web browser) in some instances, such methods of configuration become fragmented and the operator may be required to know specifics of the network configuration that hosts the monitoring device and the particulars of each device and service hosted on the device. The operator may not be aware of the network address of the device, may not be able to access the device remotely, and may not be aware of the credentials needed to configure the device. Further, by requiring the operator to log in to a monitoring device, the user experience is not seamless, as the operator would likely leave the environment of the station software for the environment of the web browser.

Methods and systems described below enable the configuration of devices and services on devices to be configured from the station or hub. As described below, the station software may enable an operator to log in to a monitoring device in a seamless way to configure settings (or view information) for services in the monitoring device. Because the operator does not necessarily leave the environment of the station software, the user experience is seamless. Further, the station software can manage the network addresses of monitoring devices and the appropriate credentials for the operator of the station software. In addition, methods and systems described below enable the station software to interact with service software in monitoring devices when appropriate—without necessarily having to update the station software to "keep up" with updates in the service software. The station or hub (or station software) is referred to as a "management device" below.

FIG. 1 is a block diagram of an exemplary environment 100 in which the systems and methods described below may be implemented. As shown in FIG. 1, environment 100 may include monitoring devices 110, a network 120, and a management device 130. Devices 110 may include devices 110-A through 110-N (referred to collectively as "devices 110" or "monitoring devices 110," and individually as "device 110").

In one embodiment, device 110 may include a monitoring device, such as a camera. As a camera, device 110 may determine when motion occurs in the field of view and issue an event to other devices in environment 100 (e.g., such as management device 130). As a camera (or infra-red sensor), device 110 may count the number of individuals passing by the field of view. Additionally or alternatively, device 110 may include a thermal camera, a heat detector, a smoke detector, a carbon monoxide detector, a humidity detector, a temperature detector, a motion detector (e.g., image based, infra-red based, etc.), an open/closed detector, etc.

In another embodiment, device 110 may include a controller with one or more peripherals connected to the controller (such as the devices listed above). In one embodiment, devices 110 may include a physical access control system (PACS). For example, a particular device 110 may include a controller that controls access to a secure area, such as a room or a group of rooms. As a physical access controller, device 110 may receive credentials (e.g., access card credentials) via a reader device and may determine whether the credentials are authentic and associated with authority to access the secure area. If so, the controller may issue a command to open a lock on a door or perform other operations associated with granting access to the secure area.

Network 120 may enable devices in environment 100 to communicate with each other. For example devices 110 may communicate with each other and management device 130 and/or management device 130 may communicate with any one of devices 110. Network 120 may include one or more circuit-switched networks and/or packet-switched networks. For example, network 120 may include a local area network (LAN), a wide area network (WAN), a metropolitan area network (MAN), a Public Switched Telephone Network (PSTN), an ad hoc network, a wireless mesh network, an intranet, the Internet, a fiber optic-based network, a wireless network, and/or a combination of these or other types of networks.

Management device 130 enables an administrator or an operator to connect to a particular device 110 to configure the device, change a configuration of device 110, receive information from device 110, and/or otherwise administer device 110. Management device 130 may also enable an administrator or an operator to monitor environment 100 (including devices 110). For example, an operator may monitor environment 100 for intrusion detection (e.g., device 110 as a camera to secure a building), for flooding (e.g., device 110 as a moisture detector for water damage mitigation), for fire (e.g., device 110 as a smoke detector for fire damage mitigation), etc.

Management device 130 may include any device configured for communicating with device 110. For example, management device 130 may include a portable communication device (e.g., a mobile phone, a smart phone, a phablet device, a wearable computer device, a global positioning system (GPS) device, and/or another type of wireless device); a personal computer or workstation (e.g., with a monitor, keyboard, mouse, etc.); a server device; a laptop, tablet, or another type of portable computer; and/or any type of device with communication capability. In one embodiment, management device 130 may be part of device 110. As such, an administrator may administer any device 110 from one or more of devices 110.

In one embodiment described below, management device 130 may enable an operator to configure settings in device 110 without the software in management device 130 necessarily having to be updated for every service provided by device 110 or every device 110.

Management device 130 may include one or more devices, such as computer devices or modules, for receiving data (e.g., event messages, video, or images) from devices 110. For example, management device 130 may include one or more displays for displaying image data captured by device 110 (e.g., a camera) and/or may include one or more storage devices for storing the captured image data.

Figure 6A:
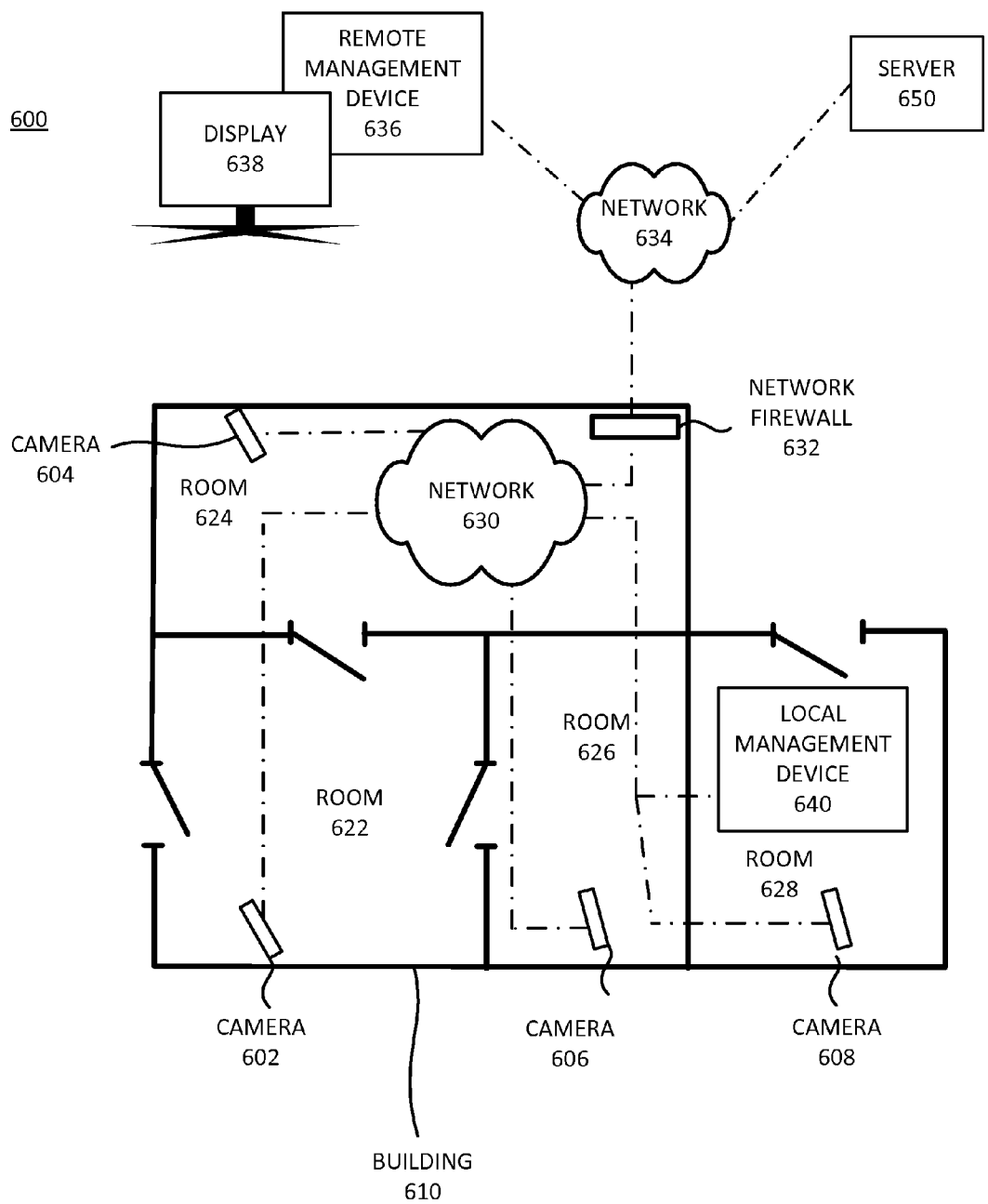
FIG. 6A is a block diagram of another exemplary environment according to an embodiment.

Although FIG. 1 shows exemplary components of environment 100, in other implementations, environment 100 may include fewer components, different components, differently arranged components, or additional components than depicted in FIG. 1. Additionally or alternatively, any one device in environment 100 (or any group of devices) may perform functions described as performed by one or more other devices in environment 100. FIG. 6A described below, illustrates another exemplary environment in one embodiment.

Figure 2:
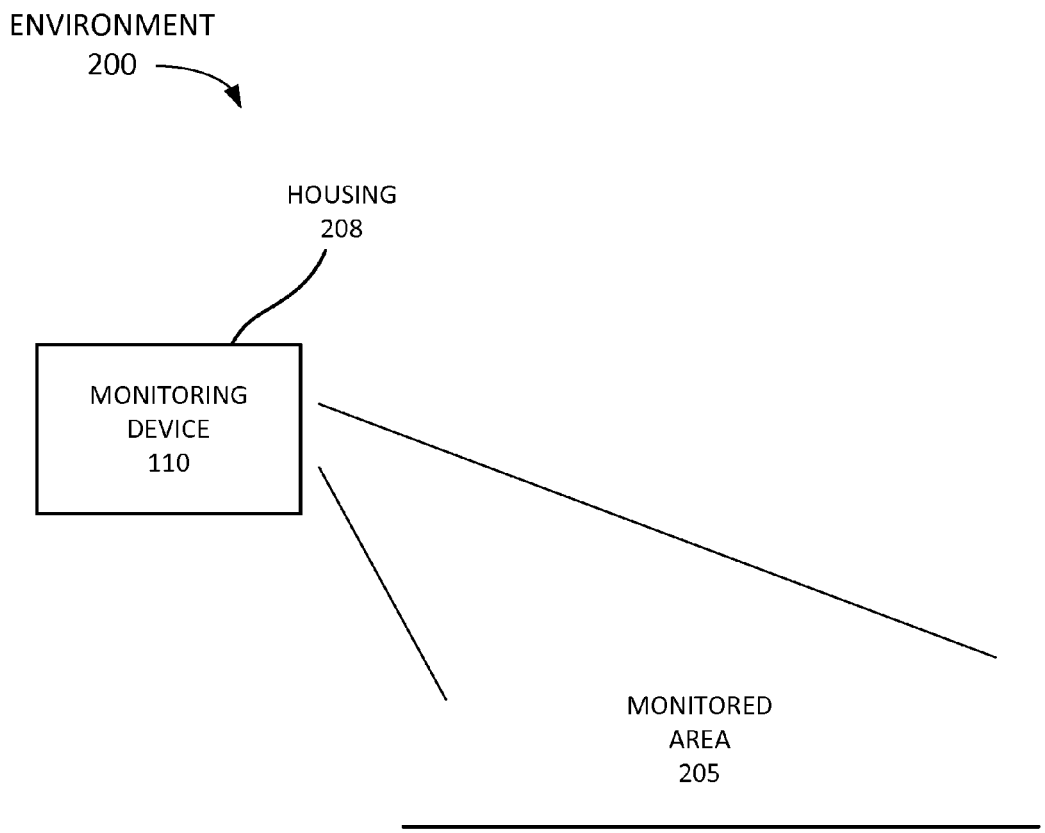
FIG. 2 is a diagram of an exemplary environment of the device shown in FIG. 1.

FIG. 2 is a diagram of an exemplary environment 200 in one embodiment (e.g., in the case where device 110 includes a camera). As shown in FIG. 2, environment 200 may include a monitoring device 110 (e.g., having a housing 208), and a monitored area 205. Monitored area 205 includes the area monitored by device 110. For example, if monitoring device 110 is installed above a door, monitored area 205 may include the area in front of the door.

Monitoring device 110 (e.g., as a camera) may include one or more devices for capturing images of monitored area 205. Monitoring device 110 may include, for example, a video camera that captures image data using visible light, using infrared light, and/or using other non-visible electromagnetic radiation. The captured image data may include a continuous video sequence, a limited video sequence that does not include a continuous sequence of images, still images, and/or a combination thereof. Monitoring device 110 may include a digital camera for capturing digital images and/or an analog camera for capturing analog images.

Although FIG. 2 shows exemplary components of device 110, in other implementations, device 110 may include fewer components, different components, additional components, or differently arranged components than depicted in FIG. 2. As an example, a device 110 may be a peripheral (e.g., a sensor) in a housing that is coupled to a controller or a hub (e.g., controller 360) in a different housing.

Figure 3A:
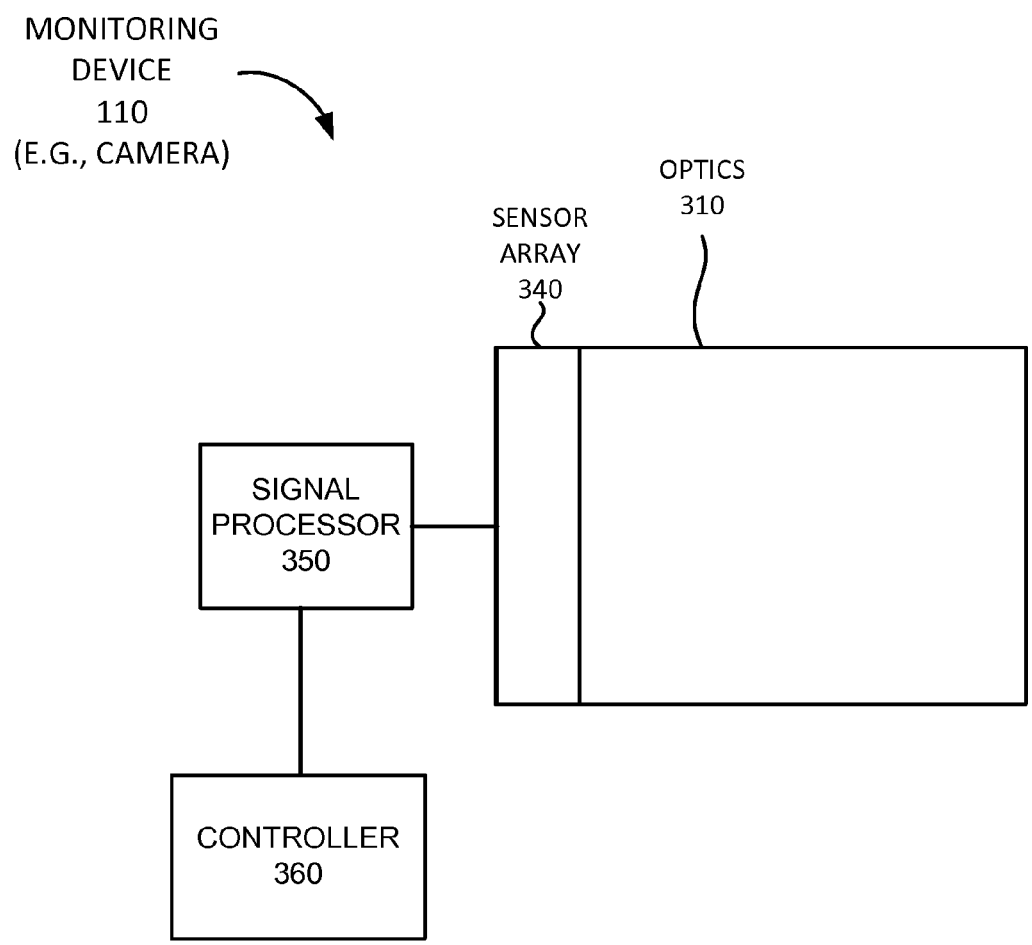
FIG. 3A is a block diagram illustrating exemplary components of the device shown in FIG. 1.

FIG. 3A is a diagram illustrating exemplary components of monitoring device 110 (e.g., a camera) according to one embodiment. As shown in FIG. 3A, monitoring device 110 may include optics 310, a sensor array 340, a signal processor 350, and a controller 360.

Optics 310 includes an enclosure that directs incident light to a sensor area that includes sensor array 340 to capture an image (e.g., of monitored area 205) based on the incident light. Sensor array 240 may include an array of sensors for registering incident light in the visible light wavelength range and/or in the infrared light wavelength range. Sensor array 240 may include, for example, a charged coupled device (CCD) array and/or an active pixel array (e.g., a complementary metal-oxide-semiconductor (CMOS) sensor array). Sensor array 240 may also include a microbolometer (e.g., when device 110 includes a thermal camera or detector).

Signal processor 350 performs signal processing operations on images captured by sensor array 340. For example, signal processor 350 may convert raw image data to compressed image data for controller 360 to perform further analysis or stream to another device, such as management device 130. As another example, signal processor 350 may determine a focus value for a captured image, or may perform part of the processing required to determine a focus value for a captured image (e.g., by applying an edge detection process to the captured image).

Controller 360 may control operation and/or configuration of monitoring device 110. Among other things, controller 360 may determine when motion is detected in area 205 and/or count the number of people passing by area 205 in one direction or another. Controller 360 may also enable an administrator to configure the settings of applications, services, and/or functions performed by device 110 (e.g., such as motion detection or people counting).

Figure 3B:
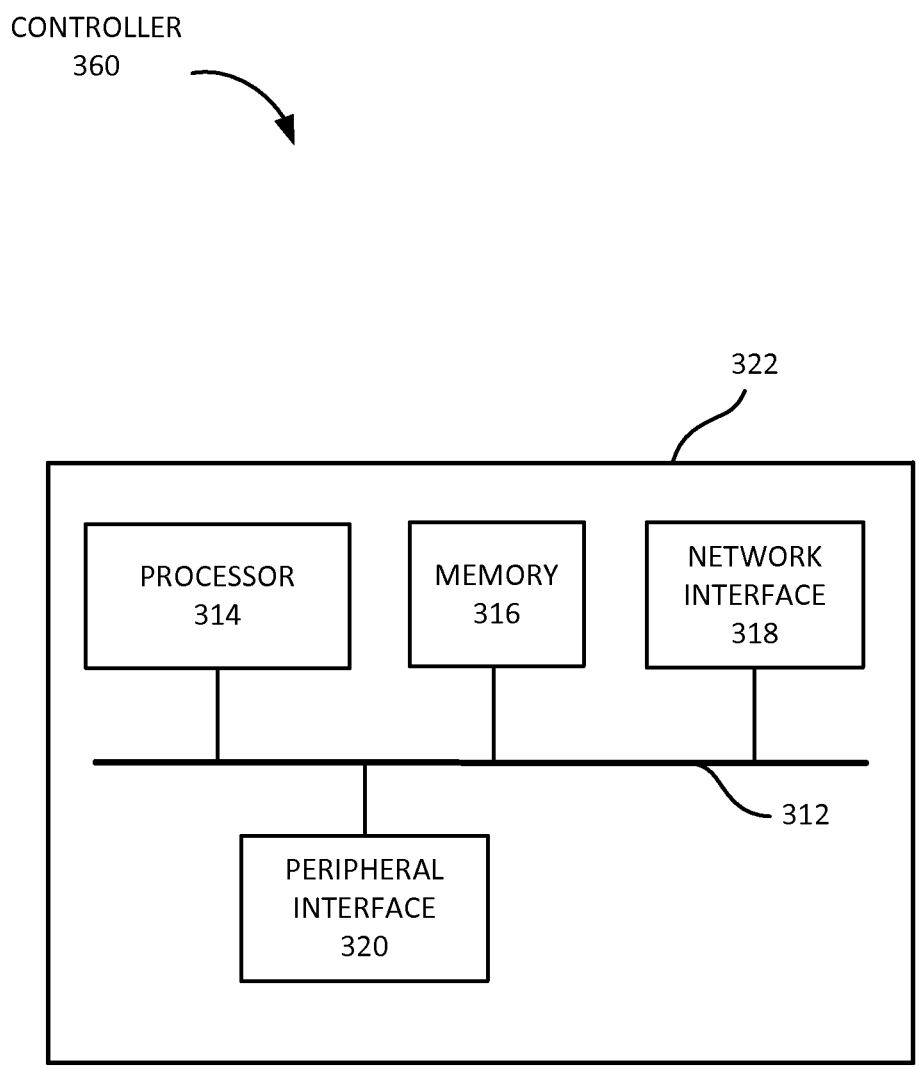
FIG. 3B is block diagram illustrating exemplary components of a controller according to an implementation described herein.

FIG. 3B is a block diagram of exemplary components of controller 360 of FIG. 3A. As shown in FIG. 3B, controller 360 may include a bus 312, a processor 314, a memory 316, a network interface 318, and a peripheral interface 320. Bus 312 includes a path that permits communication among the components of controller 360. Processor 314 may include any type of single-core processor, multi-core processor, microprocessor, latch-based processor, and/or processing logic (or families of processors, microprocessors, and/or processing logics) that interprets and executes instructions. In other embodiments, processor 314 may include an application-specific integrated circuit (ASIC), a field-programmable gate array (FPGA), and/or another type of integrated circuit or processing logic.

Memory 316 stores information, data, and/or instructions. Memory 316 may include any type of dynamic, volatile, and/or non-volatile storage device. Memory 316 may store instructions, for execution by processor 314, or information for use by processor 314. For example, memory 316 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Network interface 318 may include a transceiver (e.g., a transmitter and/or a receiver) that enables controller 360 to communicate (e.g., transmit and/or receive data) with other devices and/or systems via wired communication links (e.g., conductive wire, twisted pair cable, coaxial cable, transmission line, fiber optic cable, and/or waveguide, etc.), wireless communication links (e.g., radiofrequency, infrared, and/or visual optics, etc.), or a combination of wireless and wired communication links. Network interface 318 may include a transmitter that converts baseband signals to radiofrequency (RF) signals and/or a receiver that converts RF signals to baseband signals. Network interface 318 may be coupled to an antenna for transmitting and receiving RF signals.

Network interface 318 may include a logical component that includes input and/or output ports, input and/or output systems, and/or other input and output components that facilitate the transmission of data to other devices. For example, network interface 318 may include a network interface card (e.g., Ethernet card) for wired communications and/or a wireless network interface (e.g., a WiFi) card for wireless communications. Network interface 318 may also include a universal serial bus (USB) port for communications over a cable, a Bluetooth wireless interface, a radio-frequency identification (RFID) interface, a near-field communications (NFC) wireless interface, and/or any other type of interface that converts data from one form to another form. Network interface 318 may also employ the Thread wireless networking protocol for carrying IP communications (including IPv6) over low-powered (e.g., battery operated) wireless mesh networks. Network interface 318 may also employ the IEEE 802.15.4 protocol (e.g., ZigBee), Z-Wave, or protocols from the Open Interconnection Consortium or the AllSeen Alliance (e.g., AllJoyn).

In one embodiment (e.g., in which controller 360 is housed separately from other components of device 110), peripheral interface 320 may be configured to communicate with one or more peripheral devices. For example, peripheral interface 320 may include one or more logical components that include input and/or output ports, input and/or output systems, and/or other input and output components that facilitate the transmission of data to peripheral devices 330. As an example, peripheral interface 320 may communicate with peripheral devices 330 using a Serial Peripheral Interface Bus protocol (e.g., the Wiegand protocol, and/or the RS-485 protocol). As another example, peripheral interface 320 may use a different type of protocol. In one embodiment, network interface 318 may also act as a peripheral interface for coupling peripherals to controller 360.

Housing 322 may enclose the components of controller 360 and may protect the components of controller 360 from the environment. In one embodiment, housing 322 may include one or more of peripheral devices 230, but exclude management device 130. In another embodiment, housing 322 may include management device 130. Housing 322 may define the boundaries between devices. If housing 322 encloses a camera as well as controller 360, for example, then housing 322 provides the same function as housing 208 of monitoring device 110 shown in FIG. 2.

As described below, controller 360 may perform operations relating to configuring settings of services, applications, and/or add-ons provided by device 110. Controller 360 may perform these operations as a result of hardwired circuitry of an ASIC. Controller 360 may also (or alternatively) perform these operations in response to processor 314 executing software instructions contained in a computer-readable medium, such as memory 316. A computer-readable medium may include a non-transitory and/or tangible memory device. Memory 316 may be implemented within a single physical memory device or spread across multiple physical memory devices. The software instructions may be read into memory 316 from another computer-readable medium or from another device. The software instructions contained in memory 316 may cause processor 314 to perform processes described herein. Thus, implementations described herein are not limited to any specific combination of hardware circuitry and software.

Although FIG. 3B shows exemplary components of controller 360, in other implementations, controller 360 may include fewer components, different components, additional components, or differently arranged components than depicted in FIG. 3B. Additionally or alternatively, one or more components of controller 360 may perform one or more tasks described as being performed by one or more other components of controller 360.

Figure 4A:
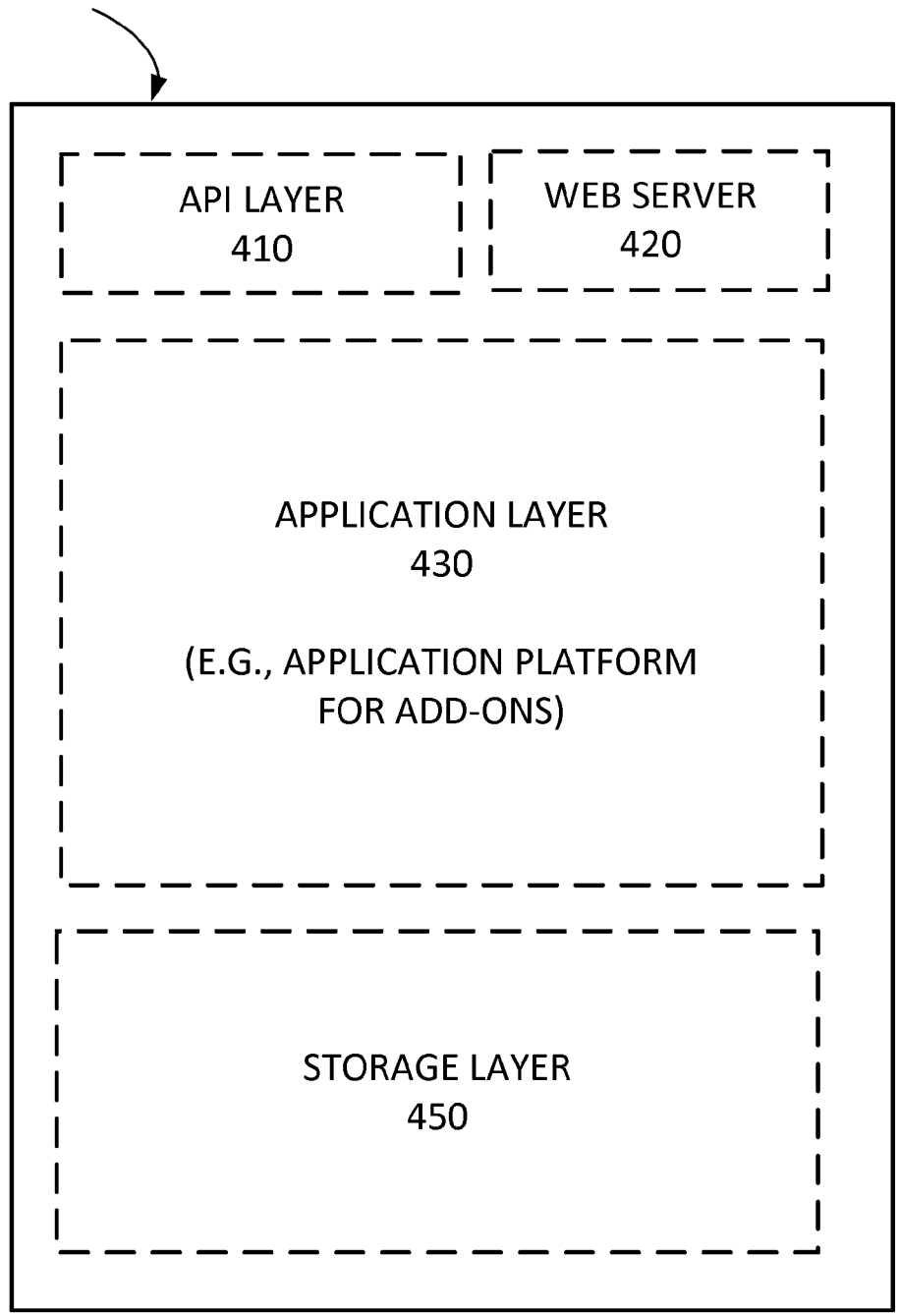
FIGS. 4A and 4B are block diagrams illustrating functional components of an exemplary device of FIG. 1 in an embodiment.

FIG. 4A is a block diagram illustrating exemplary functional components and/or layers of controller 360 of device 110. As shown in FIG. 4A, device 110 may include an application program interface (API) layer 410, a web server 420, an application layer 430, and a storage layer 450.

API layer 410 includes an API that enables device 110 to communicate with other devices or software modules. For example, API layer 410 enables communication between management device 130 (e.g., a different device) and application layer 430. API layer 410 also enables communication between web server 420 and application layer 430, for example. When an operator uses management device 130 to monitor environment 100, for example, management device 130 may communicate with device 110 through API layer 410. As another example, management device 130 may communicate with API layer 410 to change a configuration of services running in application layer 430. API layer 410 may also enable communication between applications in application layer 430. For example, people counter logic 440 may communicate with motion detection logic 438 through motion detection API 412 to receive alerts of motion in the field of view of a camera. In this way, service registry 440 can save resources by not counting people when no motion is detected. As another example, motion detection logic 438 may communicate with camera logic 432 through a camera API (not shown) to receive the video stream from the camera.

API layer 410 may also communicate with management device 130 to install an application or add-on (e.g., or any other software component) in application layer 420. API layer 410 may be configured to handle different administrator types. For example, API layer 410 may include an API to handle a Web Services administrator, a Linux administrator, an Open Network Video Interface Forum (ONVIF) administrator, and/or another type of API.

Web server 420 enables device 110 to serve web pages to other devices. Web server 420 may serve static pages or dynamic pages. In one embodiment, web server 420 may employ common gateway interfaces (CGIs) to generate dynamic web pages. The CGIs may be written in a scripting language, such as Active Server Pages (ASP), Server-side JavaScript, Hypertext Preprocessor (PHP), Python, Ruby or any other language. The web pages may enable an operator to configure settings of device 110, such as settings for applications, add-ons, and services provided by application layer 430. The CGIs may serve hyper-text markup language, version 5 (HTML5) for a rich experience for the operator. Web server 420 may include the Apache hyper-text transfer protocol (HTTP) web server, for example.

Application layer 430 may include one or more applications installed on device 110. Application layer 430 may be an "application platform" into which vendors can release "apps" or "add-ons" for installation into device 110. These applications, apps, or add-ons provide services, such as video recording, motion detection, people counting, door sensing, etc. Add-ons, applications, apps, and services are discussed in more detail below with respect to FIG. 4B.

Storage layer 450 may store one or more datasets associated with device 110. A dataset stored in storage layer 450 may correspond to a database, flat file, text, video, audio, device settings, etc. Applications and services in application layer 430 may use storage layer 450 to store settings, data, etc. For example, storage layer 450 may store a list of services provided by device 110.

Figure 4B:
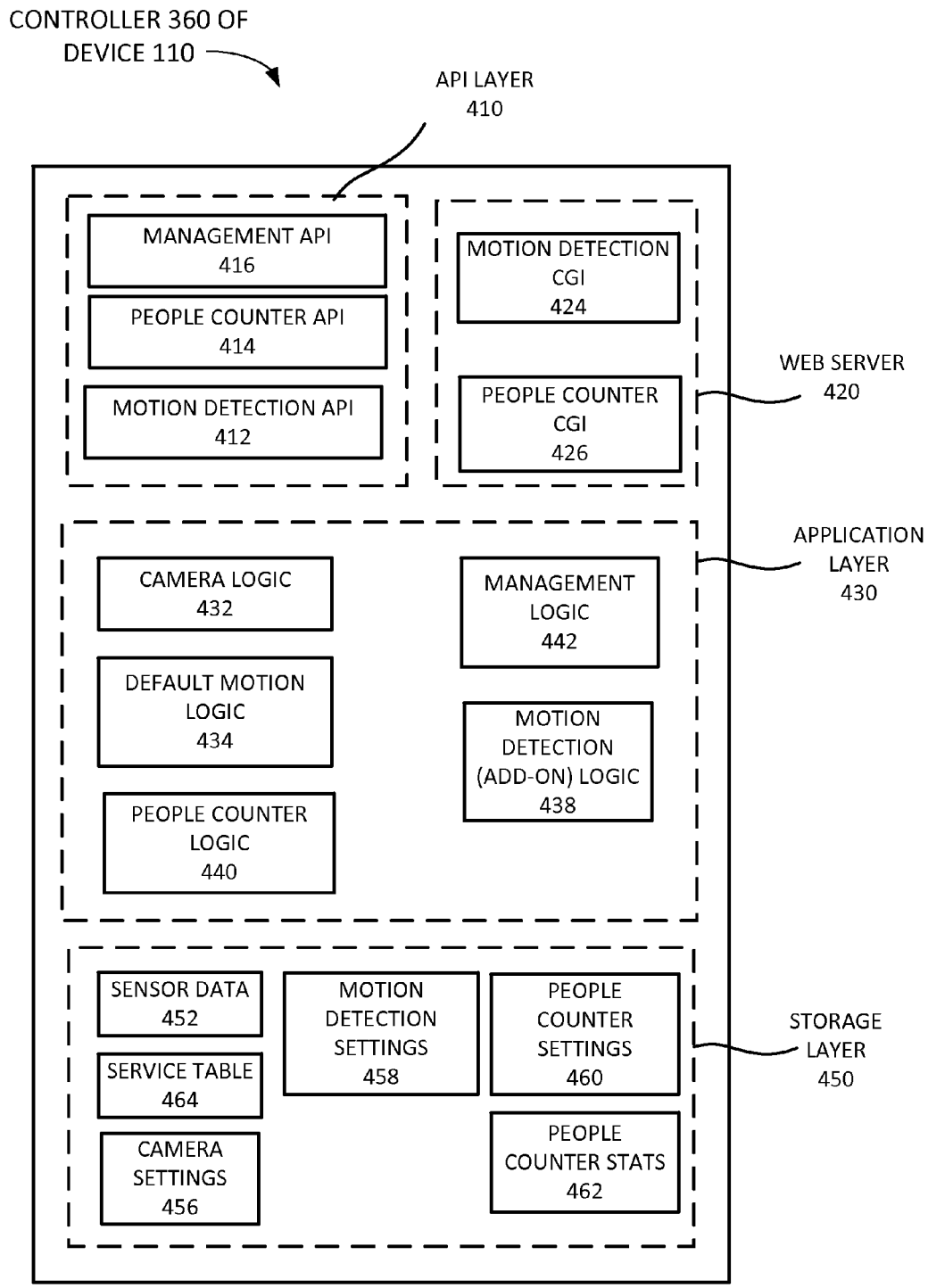

FIG. 4B is a more detailed block diagram of exemplary functional components of controller 360 in device 110. As shown in FIG. 4B, application layer 430 may include camera logic 432, default motion logic 434, motion detection logic 438, people counter logic 440, and management logic 442. As such, device 110 of FIG. 4B is configured as a camera (e.g., monitoring device 110 depicted in FIG. 3A). The logic in application layer 430 may be considered applications, apps, add-ons or another type of software, firmware, hard-wired circuitry, or a combination thereof, that provide services.

Camera logic 432 provides a service to detect images and/or video from a sensor for recording or providing to another service or device. For example, camera logic 432 may provide the video or images to default motion logic 434. Camera logic 434 may also stream captured video to management device 130, for example. Camera logic 432 may stream video to management device 130 regardless of whether motion is detected. In this case, management device 130 may display the streamed video to an operator or management device 130 may store the video for an extended period of time (e.g., record the video) when management device 130 receives an event message reporting motion.

Default motion logic 434 is a service that determines when there is motion in video captured by camera logic 432. In one embodiment, default motion logic 434 may compare one frame to another frame to determine whether there has been any motion in captured video. Logic 434 is characterized as "default" because, in this example, logic 434 comes with device 110 (e.g., is manufactured with device 110). Motion detection logic 438 provides the same service as default motion logic 434, but logic 438 is added to device 110 as an "add-on" of an application platform (application layer 430) of device 110, for example. An administrator may add motion detection logic 438 to device 110 because she is not satisfied with the default motion logic 434, for example.

People counter logic 440 inputs the video stream from camera logic 434 and counts people passing in one direction or the other, for example. People counter logic 440 may be configured so that when the net count of people in one direction exceeds a threshold number, logic 440 issues an event message (e.g., a MAX OCCUPANCY event message). People counter logic 440 may also calculate statistics with respect to the number of people that pass in each direction based on time of day, day of week, month, etc. People counter logic 440 may publish the statistics to a web page served from web server 420.

In one embodiment, management logic 442 receives information from services running in device 110 and publishes that information to other devices, such as management device 130. For example, management logic 442 may receive information to populate the information in service table 464 as described below with respect to FIG. 4C. Management logic 442 may store this information in service table 464, for example.

Storage layer 350 may include files, databases, and/or tables used by logic, software, applications, and/or add-ons in application layer 430. For example, storage layer 350 may include sensor data 452, service table 464, camera settings 456, motion detection settings 458, people counter settings 460, and people counter statistics 462.

Camera settings 456, motion detection settings 458, and people counter settings 460 may store settings information for camera logic 432, motion detection logic 438, and people counter logic 440, respectively. Camera settings 456 may include settings for white balance, focus length, aperture size, frame rate, etc. Motion detection settings 458 may include settings for area of analysis, sensitivity, etc. People counter settings 460 may include settings for angle of view, sensitivity, etc.

Sensor data 452 stores information from sensors in device 110, such as video data from camera logic 432. As noted above, sensor data 452 may also be streamed to other devices, such as management device 130. Sensor data 452 may also be used by other applications or add-ons such as motion detection logic 438.

People counter statistics 462 stores information generated by people counter logic 440, such as the number of people who have passed in one direction or the other, the net number of people who have passed in one direction, etc. People counter statistics 462 may also provide statistical analysis of information, such as counts per hour, average counts at a particular time of day, etc. This statistical information may be useful to an operator of management device 130, for example.

Service table 464 stores information about services offered by device 110 to other devices in environment 100 or to other applications or add-ons in device 110. In one embodiment, service table 464 may include a network address identifying a resource for configuring applications, add-ons, apps, and/or services provided by device 110. Device 110 may publish service table 464 to other devices in environment 100 (e.g., securely), such as management device 130. An example of service table 464 is shown in FIG. 4C.

API layer 410 provides API services to other devices or services running in device 110. API layer 410 may include motion detection API 412, people counter API 414, and management API 416. Management API 416 may publish or send information about services running on device 110 to other devices. Management API 416 may also receive requests about services running on device 110 and the network addresses used to configure the addresses.

Motion detection API 412 may receive settings from other devices or services for the operation of motion detection logic 438. People counter API 414 may receive settings from other devices or services for the operation of people counter logic 440. In one embodiment, web server 420 includes motion detection CGI 424 that serves a dynamic web page for an operator to configure motion detection logic 438 and to store the settings through motion detection API 412 to motion detection settings 458. Further, people counter CGI 426 may generate a dynamic web page for an operator to configure settings of people counter logic 440 and to store the settings through people counter API 414 to people counter settings 460.

Although FIGS. 4A and 4B show exemplary functional components of device 110, in other implementations, device 110 may include fewer functional components, different functional components, differently arranged functional components, or additional functional components than depicted in FIGS. 4A and 4B. Additionally, any one of the components (or any group of components) of device 110 may perform functions described as performed by one or more other functional components of device 110. Further, the functional components of device 110 may be implemented, for example, via hard-wired circuitry of one or more ASICs. Additionally or alternatively, the functional components of device 110 may be implemented by processor 314 executing instructions from memory 316.

FIG. 4C illustrates an exemplary service table 464. As discussed above, service table 464 lists the services provided by device 110 to other devices and may include the network addresses used to configure services running in device 110. As shown, service table 464 may include a service field 480, a vendor field 482, a network address field 484, and an event message field 486. Table 464 in FIG. 4C corresponds to the device 110 shown in FIG. 4B (e.g., a camera) and shows five services listed (i.e., records 490 through 498).

Service field 480 indicates a service provided by device 110. Examples of services include a video camera service (e.g., to provide a video stream to another device), motion detection service for a video camera, a people counter to determine the number of people who have passed a camera in one direction or another, etc. Possible services may also include a door lock that unlocks when the correct code is entered into the lock.

Some services listed in service field 480 may be included with device 110 when device is manufactured. These services are considered "default" services (which may be updated). Other services (e.g., add-ons) may be installed in device 110 after manufacture by the user (e.g., administrator or operator). These services are considered "add-on" services provided by add-on software, apps, or applications. In one embodiment, the add-on services may be software installed in as part of software platform provided by the manufacturer of device 110.

As noted above, the services listed in field 480 may be provided by different vendors (e.g., different than the manufacturer of device 110). Vendor field 482 indicates the vendor of the corresponding service (e.g., add-on or application) and the version of the service (e.g., version of the add-on or application). Service table 452 in FIG. 4B shows three different vendors: Acme, Sentry, and PCC. In this example, Acme (also the manufacturer of device 110) provided the default camera service (listed in record 490) and a motion detection service (listed in record 492).

A service listed in service field 480 may be associated with a network address at which a user can configure settings associated with the corresponding service. Network address field 484 stores the network address associated with configuring settings for the corresponding service. The network address may include a universal resource locator (URL), a universal resource indicator (URI), or any other type of network address. The resource stored at the network address may include a web page for configuring settings. For example, the settings associated with the motion detection service by the vendor Sentry (i.e., record 494) may be available at the following URL: https://10.1.1.1/add-on/sentry.

A service listed in service field 480 may also or alternatively be associated with a network address at which a user can view information associated with the corresponding service. Network address field 484 may also store the network address associated with viewing such information for the corresponding service. For example, the statistics provided by the people counter associated with the people counting service by the vendor PCC (i.e., record 498) may be available at the following URL: https://10.1.1.1/add-on/counter-stats. In one embodiment, network address field 484 may store the relative network address associated the corresponding service (e.g., relative to the network address of device 110). For example, the URL in record 498 may be stored as: /add-on/counter-stats. In this embodiment, management logic 442 may concatenate the network address of device 110 before storing it in service table 464 or when the network address is requested by another device (e.g., management device 130). Alternatively, management logic 442 may not concatenate the network address of device 110 because any requesting device may already be aware of the network address of device 110.

A service listed in service field 480 may be associated with event messages. Event message field 486 stores the event messages associated with the corresponding event. For example, a motion detection service may issue a MOTION DETECTED event message (i.e., record 494). A people-counting service may issue a MAX OCCUPANCY event message (i.e., record 496).

In the exemplary service table 464 of FIG. 4C, service field 480 includes CAMERA (i.e., in record 490 and corresponding to camera logic 432), MOTION DETECTION (i.e., in record 492 corresponding to default motion logic 434), MOTION DETECTION (i.e., in record 494 corresponding to motion detection logic 438), PEOPLE COUNTER (i.e., in record 496 corresponding to people counter logic 440), and PEOPLE COUNTER (i.e., in record 498 also corresponding to people counter logic 440). Although there are two PEOPLE COUNTER services, record 496 is associated with a network address for configuration (10.1.1.1/add-on/counter-config) and record 498 is associated with a network address for cumulative statistics. (10.1.1.1/add-on/counter-stats). Further, although there are two MOTION DETECTION services, record 492 is the default service provided by the manufacturer of device 110 and record 494 is associated with the add-on in application layer 430.

Service table 464 may include more, fewer, or a different arrangement of fields. For example, table 464 may include a state field (not shown) that indicates whether the service is currently running or not running. Table 464 may omit the event message field 486, for example.

Figure 5A:
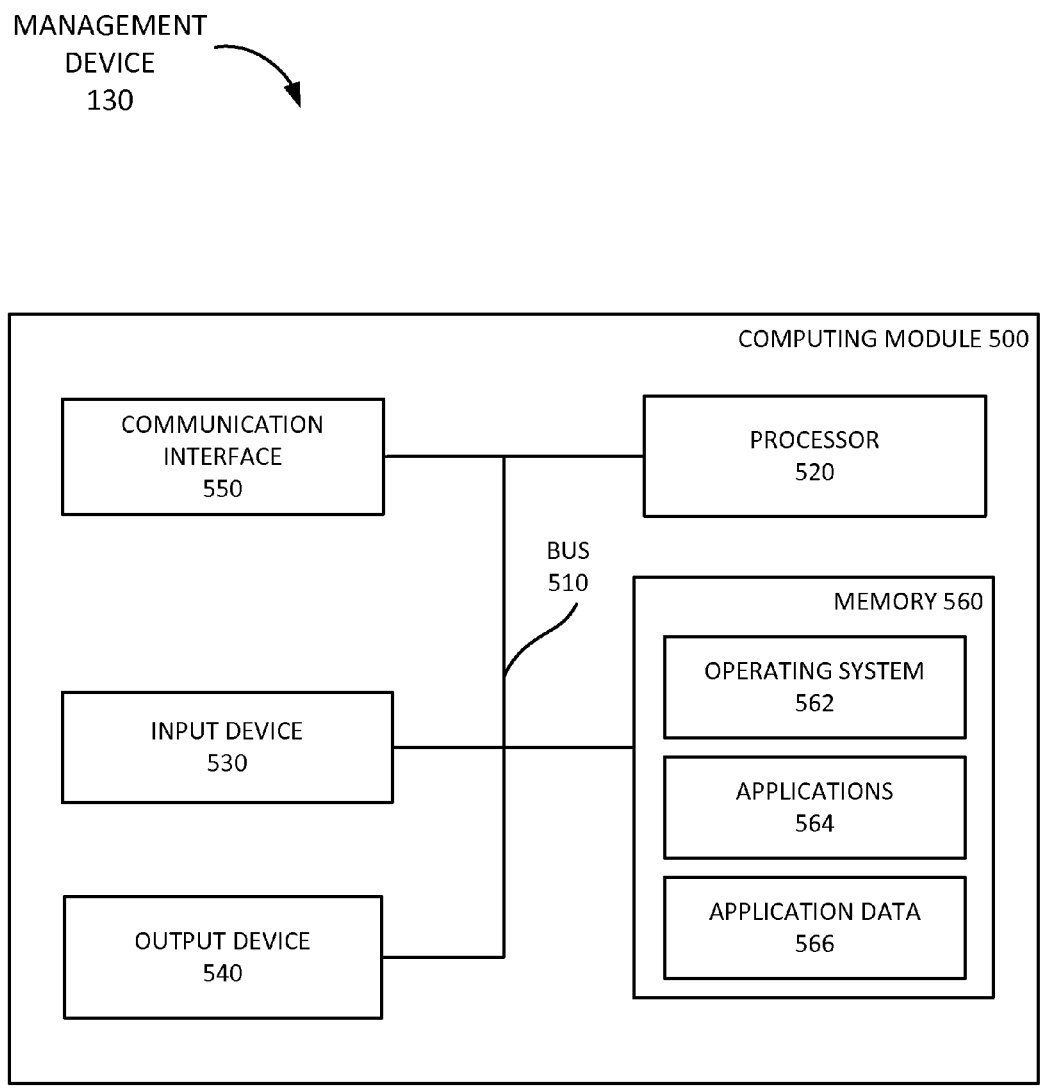
FIG. 5A is a block diagram illustrating exemplary components of the management device of FIG. 1.

FIG. 5A is a block diagram illustrating exemplary components of management device 130. Computing module 500 may include other components (not shown) that aid in receiving, transmitting, and/or processing data. Moreover, other configurations of components in computing module 500 are possible.

Bus 510 may include a path that permits communication among the components of computing module 500. Processor 520 may include any type of processor or microprocessor (or families of processors or microprocessors) that interprets and executes instructions. In other embodiments, processor 520 may include an ASIC, an FPGA, etc.

Input device 530 may enable a user to input information into computing module 500. Input device 530 may include a keyboard, a mouse, a pen, a microphone, an audio capture device, an image and/or video capture device, a touch-screen display, etc. Output device 540 may output information to the user. Output device 540 may include a display, a printer, a speaker, etc. Input device 530 and output device 540 may enable a user to activate and interact with a particular service or application. Input device 530 and output device 540 may enable a user to receive and view a menu of options and select from the menu options. The menu may enable the user to select various functions or services associated with applications executed by computing module 500.

Communication interface 550 includes a transceiver that enables computing module 500 to communicate with other devices. Communication interface 550 may include a transmitter that converts baseband signals to RF signals or a receiver that converts RF signals to baseband signals. Communication interface 550 may be coupled to an antenna for transmitting and receiving RF signals. Communication interface 550 may include a network interface card, e.g., Ethernet card, for wired communications or a wireless network interface (e.g., a WiFi) card for wireless communications. Communication interface 550 may also include, for example, a USB port for communications over a cable, a Bluetooth wireless interface, an RFID interface, an NFC wireless interface, etc.

Memory 560 may store, among other things, information and instructions (e.g., applications 564 and operating system 562) and data (e.g., application data 566) for use by processor 520. Memory 660 may include a RAM or another type of dynamic storage device, a ROM device or another type of static storage device, and/or some other type of magnetic or optical recording medium and its corresponding drive (e.g., a hard disk drive).

Operating system 562 may include software instructions for managing hardware and software resources of computing module 500. For example, operating system 562 may include Linux, Windows, OS X, Android, an embedded operating system, etc. Applications 564 and application data 566 may provide network services or include applications, depending on the device in which the particular computing module 500 is found.

Computing module 500 may perform the operations described herein in response to processor 520 executing software instructions contained in a computer-readable medium, such as memory 560. A computer-readable medium may include a non-transitory and/or tangible memory device. The software instructions may be read into memory 560 from another computer-readable medium or from another device via communication interface 550. The software instructions contained in memory 560 may cause processor 520 to perform processes that are described herein.

Figure 5B:
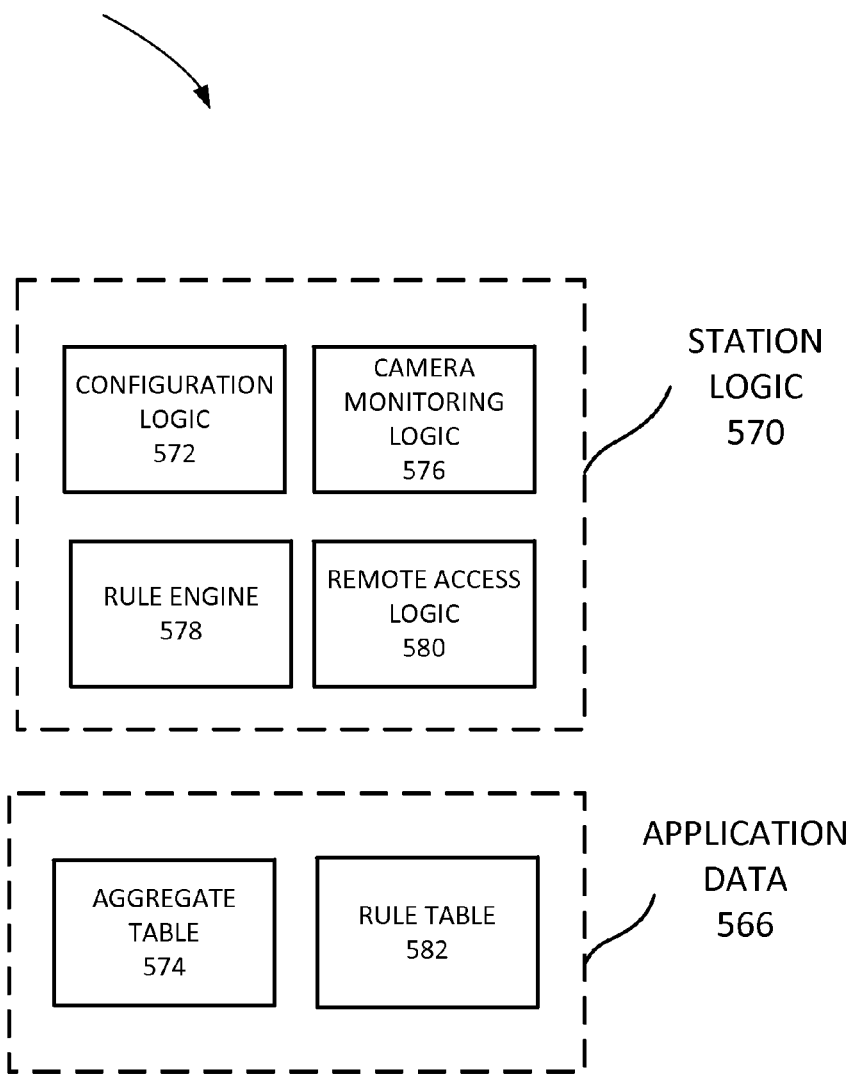
FIG. 5B is a block diagram illustrating functional components of the management device shown in FIG. 1.

FIG. 5B is a block diagram of functional components of management device 130, e.g., applications 564 and application data 566 in management device 130. Applications 564 may include station logic 570, which may include configuration logic 572, camera monitoring logic 576, rule engine 578, and remote access logic 580. Application data may include aggregate table 574 and rule table 582.

In general, station logic 570 enables an operator to sit at her "station" and view the live status of all monitoring devices 110, such as many cameras, on a display. Station logic 570 enables the operator to perform other functions. For example, configuration logic 572 enables the operator to change the configuration of settings in devices 110 or view operational information related to devices 110. In one embodiment, configuration logic 572 may use information stored in aggregate table 574 to enable the operator to configure settings.

Camera monitoring logic 576 enables the operator to view the video streams from multiple cameras. Rule engine 578 interprets rules stored in rule table 582 and performs actions when the conditions of the rules are met. For example, if motion is detected (e.g., a MOTION DETECTED event message is received) by a camera, rule engine 578 may sound an alarm. Remote access logic 580 enables a user to gain access to station logic 570 from a remote network or device. In one embodiment, the remote network or device may also include station logic 570. In this case, the remote device may be considered a remote management device. In one embodiment, video and event messages from one management device may be forwarded to another (e.g., remote) management device. Remote access logic 580 may also enable station logic 570 to perform the functions of a proxy device.

Applications 564 and application data 566 may include more, fewer, or a different arrangement of components. For example, station logic 570 may include a web browser rendering engine, such as Gecko from the Mozilla Foundation, WebKit, or Blink.

FIG. 6A is a block diagram illustrating another exemplary environment 600 in one embodiment. As shown in FIG. 6A environment 600 includes a building 610 with rooms 622, 624, and 626. Rooms 622, 624, 626, and 628 have cameras 602, 604, 606, and 608, respectively. Cameras 602, 606, and 608 are connected to a network 630 (e.g., a local network). Management device 130 is also in building 610 and is connected to network 630. A remote management device 636 (with display 638) connects to network 630 through a network 634 (e.g., a wide-area network) and a network firewall 632. Remote management device 636 may be referred to more simply as "remote device 636." In one embodiment, remote management device 636 is configured similarly to management device 130 discussed above with respect to FIGS. 5A and 5B. Environment 600 also includes a local management device 640 located within building 610 and connected in network 630. In one embodiment, remote management device 636 is configured similarly to management device 130 discussed above with respect to FIGS. 5A and 5B. Therefore, local management device 640 may perform all or some of the functions discussed as management device 130; remote management device 636 may perform all or some of the functions discussed as management device 130; or both remote management device 636 and local management device 640 may perform the functions discussed as management device 130 in tandem.

In this example, cameras 602, 604, 606, and 608 correspond to devices 110 and monitor doors to rooms 622, 624, 626, and 628, respectively. Local network 630 may employ the Internet Protocol over Ethernet and may interconnect devices 110 and local management device 640. Network 634 may include the Internet for connecting remote management device 636 to network 630 (and, hence, connect remote management device 636 to cameras 602, 604, 606, and 608 and local management device 640). Firewall 632 may protect network 630 from unsolicited packets from network 634. Firewall 632 may include a network address translation (NAT) function, for example.

Remote management device 636 including display 638 enable an operator or an administrator to interact with local management device 640 and/or devices 110 (such as cameras 602-608). Remote device 636 and display 638 may be considered part of management device 130 in that station logic 570 enables for remote monitoring. In one embodiment, station logic 570 performs the necessary services enabling remote management device 636 to discover local management device 640 and/or devices 110 and allow data to traverse firewall 632 between remote management device 636 and local management device 130 and/or devices 110. In one embodiment, local management device 130 may also act as a proxy. In this embodiment, local management device 130 may proxy web pages hosted by device 110 so that they can be loaded by remote device 636 to be rendered on display 638. In other words, a web page may be loaded to management device 130 through an intermediate server acting as a proxy device. In the example of FIG. 6A, a web page may be loaded to remote management device 636 through a local management device 640 (an intermediate device) acting as a proxy. Nonetheless, remote management device 636 including display 638 may be considered its own management device (discussed with respect to FIGS. 5A and 5B) or as part of management device 130 (i.e., local management device 640 and remote management device 636 being considered as two parts of a single management device).

FIG. 6B is an exemplary aggregate table 574 stored in application data 566 of management device 130. Management device 130 (e.g., configuration logic 572) may query cameras 602, 604, and 608 (e.g., devices 110) to generate aggregate table 574. That is, aggregate table 574 is an aggregation of service tables from devices 110 in any particular environment.

Like service table 464, aggregate table 574 includes a service field 680, a vendor field 682, a network address field 684, and an event message field 686. Fields 680-688 may store the same type of information as described above for service table 464. Aggregate table 574 may also include a device field 688, which is not described above. Device field 688 identifies the device on which the corresponding service resides. Because aggregate table 574 aggregates information from many different devices, device field 688 helps to distinguish these different services on different devices. Aggregate table 574 shows records from camera 602 and 604. Aggregate table 574 may also include records from other devices in environment 600, such as cameras 606 and 608.

Figure 7:
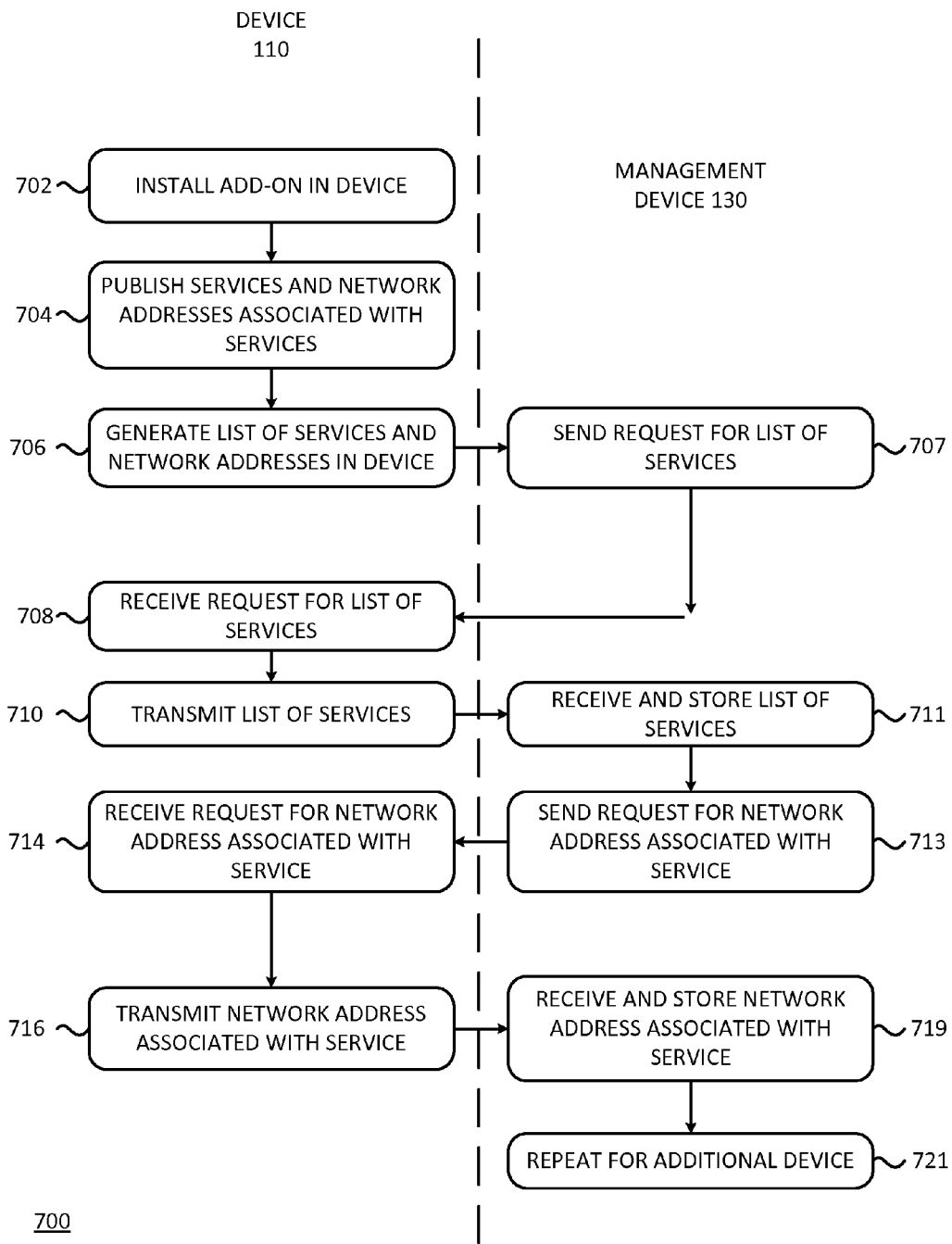
FIG. 7 is a flowchart of an exemplary process for distributing network addresses for configuring devices in the network of the exemplary environment of FIG. 6A.

FIG. 7 is a flowchart of an exemplary process 700 for distributing network addresses for configuring services in a device. Process 700 may be performed by device 110 (e.g., processor 254 in controller 360 executing management logic 442) and/or management device 130 (e.g., processor 520 in computing module 500 executing configuration logic 572). As shown in FIG. 7, device 110 may perform acts on the left side of the flowchart and management device 130 may perform acts on the right side of the flowchart. Lines from the left side to the right side, or vice versa, may represent messages sent between the two devices. In the discussion of process 700, management device 130 may refer to a local management device (e.g., management device 640), a remote management device (e.g., management device 636), or a combination of a local and remote management device. In one embodiment, process 700 may start with the installation of an add-on in device 110 (block 702). For example, although camera 602 in FIG. 6A may include default motion logic 434 for detecting motion, an administrator may want more features than offered with the default and install motion detection logic 438 as an add-on. In this case, camera 602 receives the add-on and installs the add-on (block 702) in the application platform in application layer 430. Installing motion detection logic 438 may also entail installing motion detection API 414 for other devices or components to interact with motion detection logic 438 (such as for configuring settings). Further, installing motion detection logic 438 may also entail installing motion detection settings 458 (e.g., default settings for logic 438).

In this example, the administrator also installs people counter logic 440 into device 110 (e.g., application layer 430). This entails device 110 installing counter logic 440, counter API 414, counter settings 460, and counter statistics 462 (block 702). Further, motion detection logic 438 and people counter logic 440 are provided by a different vendor than station logic 570 and a different vendor than device 110 (e.g., default motion logic 434). That is, in this example, station logic 570 does not have the software or logic to interact directly with detection API 412 or counter API 414.

Because motion detection logic 438 and people counter logic 440 are designed for application layer 430 (e.g., an application platform) of camera 602, detection logic 438 and counter logic 440 may make certain information available to management logic 442. For example, each service (e.g., detection logic 438 and counter logic 440) may publish or make available a list of services offered by the particular add-on (block 704). Motion detector logic 438 may make the information in record 494 available to management logic 442 (e.g., management logic 442 may not have recorded that information into table 464 yet). People counter logic 440 may make the information available in records 496 and 498 available to management logic 442 (e.g., management logic 442 may not have recorded that information in table 464 yet). The services (such as the add-ons) may use an API offered by management logic 442 (i.e., management API 416) to make this information available.

Device 110 may generate a list of services, corresponding events, and network addresses (block 706). In the current example, management logic 442 in camera 602 may take the information published by the various services (e.g., motion detection logic 438 and people counter logic 440) to generate the information in service table 464. Device 110 may store table 464 to storage layer 450, as shown in FIG. 4B.

As part of monitoring environment 600, for example, management device 130 may send a request to device 110 (e.g., camera 602) for a list of services (block 707). Device 110 may receive the request for a list of services (block 708). Management device 130 may interact with management logic 442 through management API 416. In this example, management logic 442 of camera 602 receives a request for the list of services from management device 130 (e.g., from configuration logic 572 in management device 130). The request may include a request for a list of services, a list of network addresses associated with each service, and/or a list of events associated with each service.

Device 110 transmits the list of services (block 710) to the requesting device or service (block 710). In the current example, management logic 442 of camera 602 transmits the requested information from device 110 to management device 130 (e.g., to configuration logic 572). The list may include the information in table 464, such as service field 480 and vendor field 482. In one embodiment, the list may also include the information in network address field 484 and/or event message field 486. Management device 130 receives the list of services from device 110 (e.g., camera 602) (block 711) and stores the information in aggregate table 574. Management device 130 also adds information in device field 688 to identify the corresponding device associated with the information. In one embodiment, management device 130 also receives the identification of event messages associated with the services in the list.

If management device 130 is aware of a service, but not aware of the network address associated with the service, management device 130 may request the associated network addresses (block 713). Device 110 (e.g., camera 602) receives the request for a network address associated with a service (block 714). Management device 130 may interact with management logic 442 through management API 416. In one embodiment, management device 130 does not request the network address until needed, such as when an operator wants to adjust the settings of a service. Device 110 may transmit the network address associated with the service (block 716). In the current example, management logic 442 of camera 602 receives a request for the network address associated with a service, management logic 442 responds to management device 130 with the network address from network address field 484 of service table 464. Management logic 442 may respond to management device 130 (e.g., configuration logic 572) through management API 416.

Management device 130 (e.g., station logic 570) receives the network addresses and stores the addresses in aggregate table 574 (block 719). Management device 130 also adds information in device field 688 to identify the corresponding device associated with the information. Process 700 may be repeated (e.g., in each device 110 and repeatedly in management device 130) to generate different service tables for each device 110 and aggregate the information in aggregate table 574.

Figure 8:
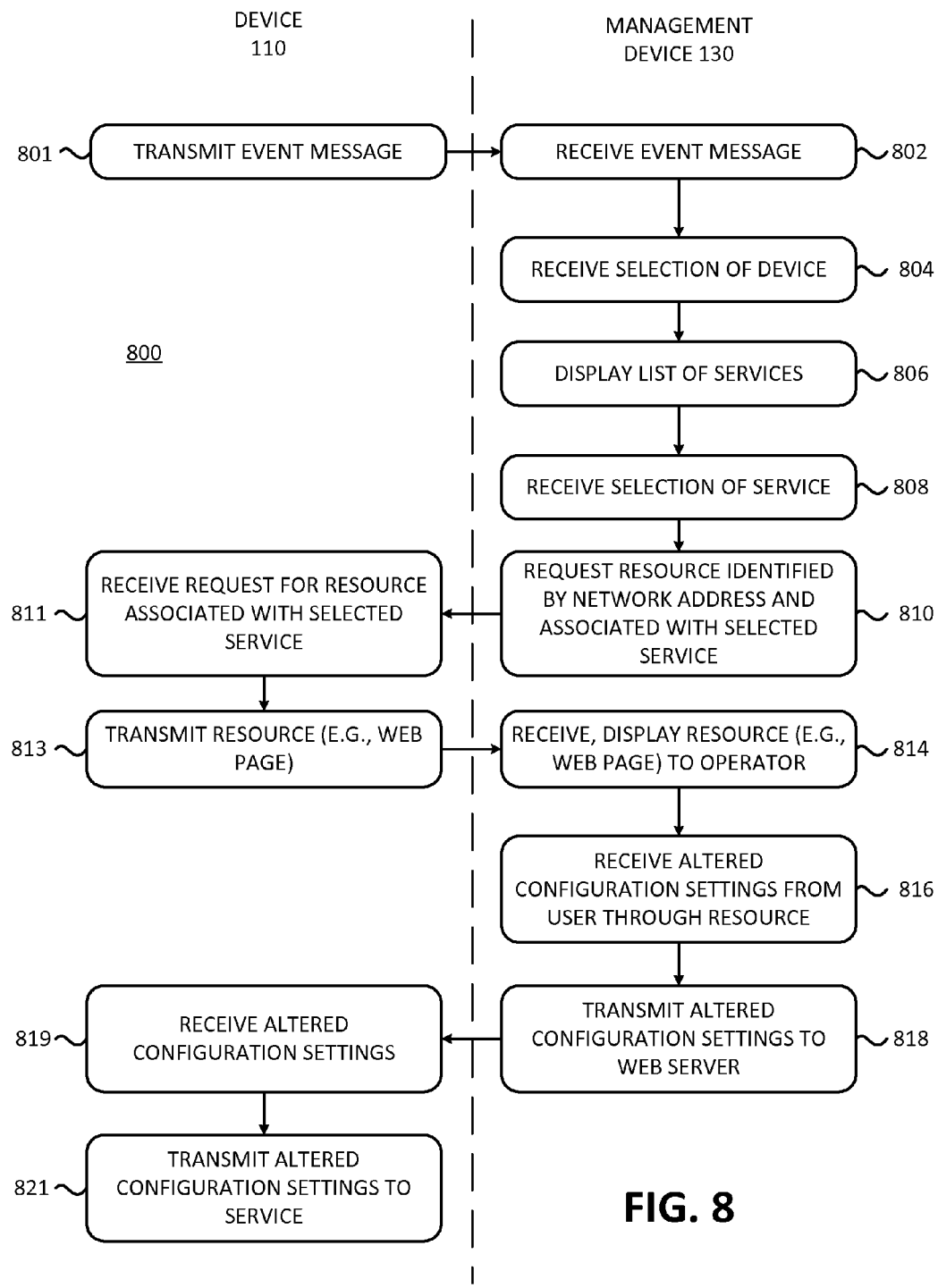
FIG. 8 is a flowchart of an exemplary process for configuring devices in the network of the environment of FIG. 6A.
Figure 9A:
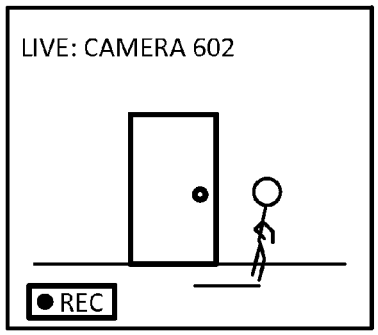
Figure 9A:
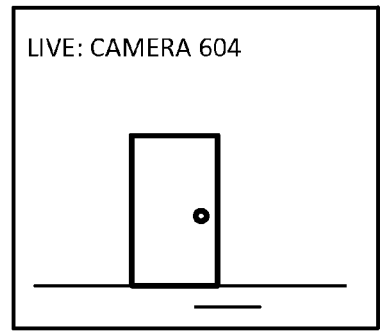
Figure 9A:
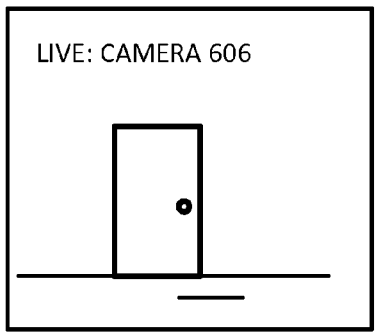
Figure 9A:
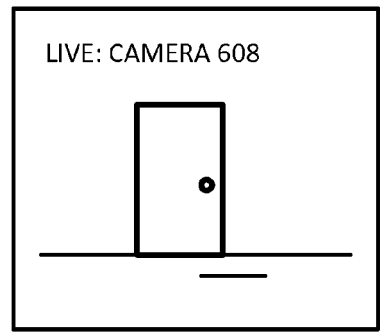

FIG. 8 is a flowchart of an exemplary process 800 for configuring settings of a service in a device 110 from management device 130. Process 800 may be performed by management device 130 (e.g., processor 520 executing configuration logic 572) and/or device 110 (e.g., processor 314 executing management logic 442). As shown in FIG. 8, device 110 may perform acts on the left side of the flowchart and management device 130 may perform acts on the right side of the flowchart. Lines from the left side to the right side, or vice versa, may represent messages sent between the two devices. In the discussion of process 800, management device 130 may refer to a local management device (e.g., management device 640), a remote management device (e.g., management device 636), or a combination of a local and remote management device. In the example below, an operator sits in front of display 638 of remote management device 636 and uses station logic 570 and camera monitoring logic 576 to watch the stream of live video from camera 602, 604, 606, and 608. FIG. 9A illustrates display 638 showing the live view of these cameras. In another example consistent with the description of process 800, an operator may sit in front of a display (not shown) of local management device 640 and use station logic 570 and camera monitoring logic 576 to watch the stream of live video from cameras 602-608.

Process 800 may start with management device 130 receiving an event message (block 802) transmitted from a monitoring device 110 (block 801). In this example, camera 602 sends a video stream to management device 130, which is also monitored by motion detection logic 434 in camera 602. The event message is a MOTION DETECTED event message sent from camera 602 (e.g., the motion detection service) to management device 130. In this case, according to rule table 582, rule engine 578 alerts the operator (e.g., via an audible sound and visual message) and starts to record the video stream from camera 602. FIG. 9A illustrates the visual alert on display 638, for example. The operator, however, considers the alert to be a false alarm because the sensitivity of motion of the camera is too high and the area of monitoring is too large. The operator wishes to change the sensitivity settings and the window of motion detection in motion detection logic 434 in camera 602.

The operator could open a browser application (e.g., separate from station logic 570) in management device 130 and type in the network address (e.g., IP address) of camera 602. Such an action may not work if the operator is sitting at remote device 636 because of network firewall 632. Assuming that the operator is physically present in building 510 (e.g., using local management device 640), however, then camera 602 serves a web page to the local management device 640 and may prompt the operator to enter a username and password. Once authenticated, the operator would navigate to the motion detection settings. In one embodiment, the motion detection settings are delivered to local management device 640 by motion detection settings CGI 424 (e.g., hosted at network address 10.1.1.1/add-on/sentry). In this example, the operator adjusts the settings for the motion detection and submits the adjusted settings by, for example, clicking a "submit" icon. In this case, motion detection settings CGI 424 may then send the adjusted settings to motion detection API 412 and the adjusted settings would be updated in motion detection settings 458. Accordingly, motion detection logic 434 would then operate with the new adjusted settings, and generate fewer false alarms.

In the above-described solution to the false alarm, the operator is local (e.g., in building 510 using local management device 640 or at least can access local network 630), knows the network address of the camera, how to navigate to through the settings to get to motion detection CGI 424 and change the settings. As another solution, station logic 570 could create a user interface to directly access motion detection API 412. This solution, however, requires the vendor of station logic 570 (e.g., Acme) to update its software to be compatible with the motion detection application from a different vendor (e.g., Sentry). Acme may not have the resources to add this compatibility to station logic 570. Even if Acme added this extra functionality to station logic 570, Sentry may not be satisfied with the implementation and may feel constrained when updating its motion detection software including its API.

As yet another solution, the vendor of station logic 570 (e.g., Acme) could create an "application platform" for station logic 570 enabling other vendors (e.g., Sentry) to create add-ons for station logic 570 to directly access motion detection API 412. This solution, however, requires the vendor of station logic 570 (e.g., Acme) to update its station logic 570 to include an application platform, which is a very complicated task that would significantly complicate station logic 570. In addition, every different vendor of any type of station logic 570 would have to do the same. In this case, then every vendor of add-ons for device 110 (e.g., Sentry) would have to create an add-on for the application platform of every vendor of station logic 570. Again, this would lead to increased complexity for the vendor of add-ons for devices 110, as that vendor would have to create a complimentary add-on for each possible station logic 570.

In the current example, the operator at management device 130 may know what device and/or service generated the false alarm (e.g., camera 602 motion detection). In yet another solution in one embodiment, process 800 may continue by receiving a selection of the offending device (block 804) from the operator. Sitting at remote device 632, the operator may request that station logic 570 (e.g., configuration logic 572) display a list of services provided by camera 602. Management device 130 then displays a list of services from the selected device 110 (block 806) to the operator. In the situation where the operator is sitting at remote management device 636, local management device 640 sends the information to remote device 636 for display on display 638. In other words, local management device 640 may act as a proxy for remote management device 636. FIG. 9B illustrates an exemplary display of the list of services for camera 602.

As shown in FIG. 9B, the operator selected camera 602 as device 110 to show available services and the services provided by device (e.g., camera 602) are listed. The services listed on display 638 in FIG. 9B are the same services listed in service table 464, for example, and aggregation table 574 generated in process 700. As shown in FIG. 9B, a cursor 902 hovers over a settings button 904 next to the motion detection service. The corresponding network address may appear in a pop-up information dialog as shown in FIG. 9B. The operator may then identify and select the offending service of the device 110 and management device 130 (e.g., configuration logic 572) receives the selection of the service (block 808). For example, the operator may click settings button 904.

Figure 9C:
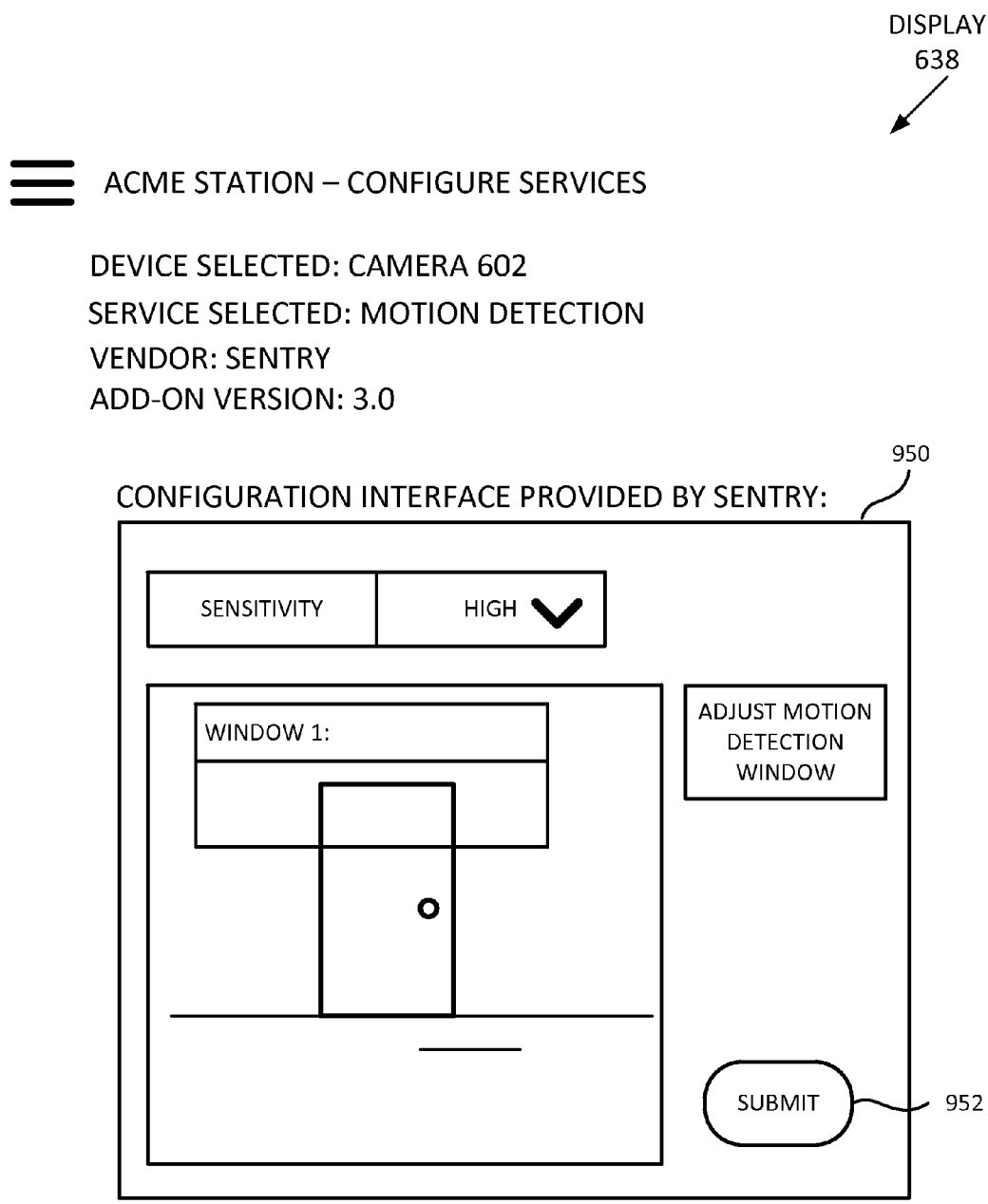

Management device 130 then determines the network address associated with the selected service and requests the resource (block 810). In one embodiment, management device 130 (e.g., configuration logic 572) stores the credentials for each device needed to authenticate and gain access to the resource at the network address to alter configuration settings. If management device 130 does not have the network address, management device 130 may perform the steps of process 700 to retrieve the appropriate network address and store it in aggregate table 574. Monitoring device receives the request (block 811) and transmits the requested resource to management device 130 (block 813). Management device 130 receives and displays the resource (e.g., a web page) on display 638 (block 814). FIG. 9C illustrates an exemplary user interface for adjusting the settings of motion detection logic 438.

As shown in FIG. 9C, the user interface in window 950 is served from camera 602 by web server 420 and motion detection CGI 424. In this case, local management device 640 acts as a proxy so that remote management device 636 can display the web page in a window on display 638. As noted above, local management device 640 may act as a proxy because remote device 636 may not have direct access to local network 630. The information displayed in window 950 is within the control of Sentry (e.g., the vendor responsible for the motion detection logic 434 and not necessarily Acme (e.g., the vendor of station logic 570). Station logic 570 may also make this distinction apparent (e.g., "CONFIGURATION INTERFACE PROVIDED BY SENTRY") to reduce any confusion on the part of the operator as to the source of the interface and information. Once the operator is satisfied with the altered configuration settings and the resource receives the altered settings (block 816). As shown in FIG. 9C, when the operator is satisfied with the altered configuration setting, the operator may, for example, click on the "submit" button 952 inside window 950. The adjusted configuration settings are transmitted to the web server 420 (block 818), which initiates an update of the configuration settings of the service based on the altered configuration setting. For example, motion detection CGI 424 in web server 420 of device 110 receives (block 819) the settings from remote management device 636 through local management device 640 acting as a proxy.

The altered configuration settings are transmitted to the service (block 821) (e.g., from web server 420 to application layer 430 through API layer 410). In the current example, motion detection CGI 424 sends the altered settings to motion detection API 412 and the configuration settings are updated (e.g., saved to motion detection settings 458).

Figure 9D:
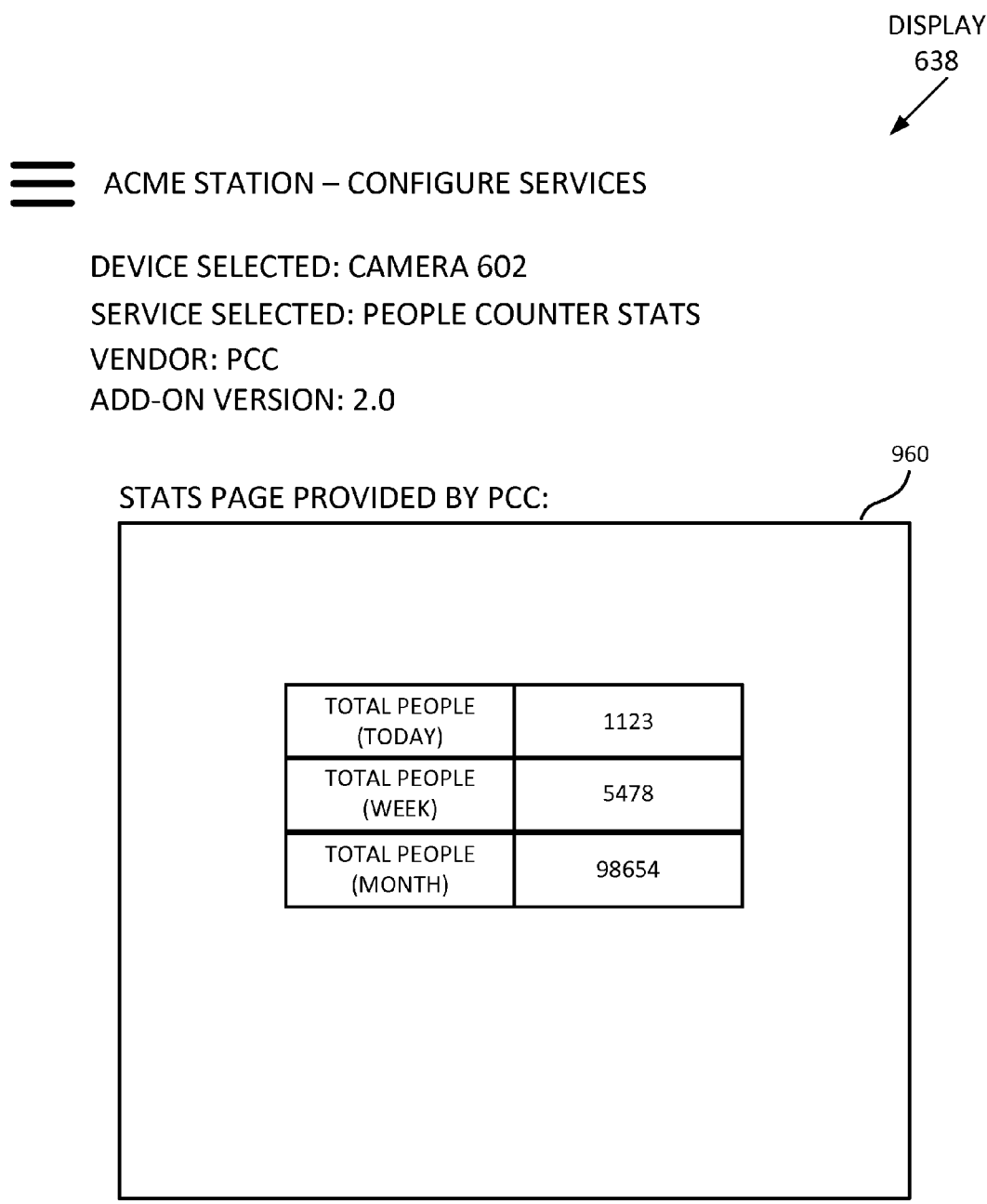

Although process 800 is described as starting with receipt of an event message (block 802), process 800 may not start with the receipt of an event message. For example, the operator may request a list of services for camera 602 as shown in FIG. 9B. The operator may select to view the statistics of the people counter service (e.g., provided by people counter logic 440). In this case, the operator may view the information on display 638 (with local management device 640 acting as a proxy). FIG. 9D is an example of such information displayed on display 638. As shown in FIG. 9D, the stats page is in window 960. The information displayed in window 960 is within the control of PCC (e.g., the vendor responsible for the people counter logic 440 434 and not necessarily Acme (e.g., the vendor of station logic 570). Station logic 570 may also make this distinction apparent (e.g., "STATS PAGE PROVIDED BY PCC") to reduce any confusion on the part of the operator as to the source of the interface and information.

Although this example entails installing an add-on into device 110 (e.g., motion detection logic 438 in camera 602), in other embodiments, the service (e.g., default motion logic 434) may already be present. In the above example, station logic 570 did not have the logic or software to interact with motion detection API 412 directly for an operator to adjust settings. In other examples, station logic 570 may include the logic or software to interact with motion detection API 412 directly for an operator to adjust settings.

In one embodiment, web server 420 and the corresponding CGIs may be hosted in a device other than device 110. For example, device 110 may be a lock that is battery operated and in a low-power wireless mesh network. In this situation, assuming that the lock has IP connectivity over the mesh network, the lock may not have sufficient bandwidth to provide a web page having a good user experience. That is, the bandwidth may be too low because of the low-power wireless physical network layer. Further, some wireless mesh networks may not be able to carry IP communications because an IP network layer has not been developed for the underlying physical network. In this case, web pages may be served from a different device than the lock (device 110).

In this embodiment, web server 420 may alternatively (or additionally) be hosted off the lock (device 110). For example, as shown in FIG. 6A a server 650 may host web server 420. Server 650 may include a computing module 500 described above with respect to FIG. 5A. In this embodiment, management device 130 requests the resource (identified by the network address) from server 650 rather than device 110 (e.g., the lock). The vendor of the particular service, app, or application would provide server 650 (just as with the CGI in web server 420). The network address may identify the particular lock (device 110) to server 650 by providing a device serial number, for example, in the query portion of a URL. Once server receives the request from management device 130, server 650 may in turn query the appropriate lock (device 110) to load the current settings to present to the operator for the operator to alter. Server 650 may communicate with the lock application (e.g., in application layer 430) through a lock API (not shown) in API layer 410.

To ensure that server 650 can reach device 110 through firewall 632, management device 130 may prompt the lock (e.g., management logic 442 in device 110) to open a channel of communication with server 650. In response, the lock (device 110) may use the appropriate API in API layer 410 to communicate with server 650. Once the operator has altered settings through the web page served by server 650, server 650 may transmit the altered settings to device 110 through the open communication channel (e.g., again through the appropriate API in API layer 410). In the case of a lock, API layer 410 may include a lock API (not shown in FIG. 4B).

Likewise, in this embodiment, motion detection CGI 424 could be hosted in web server 650 rather than (or in addition to) being hosted in device 110. Motion detection CGI 424 would then communicate with motion detection logic 438 through motion detection API 412 (just across a network rather than in the same device).

Accordingly, as described above, an operator may change the configuration settings to (or view information from) of a service provided by a device from management device 130. The operator may do this transparently through station logic 570, but without station logic 570 having to be updated to communicate directly with an API provided by the service.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 7 and 8, the order of the blocks and/or signal flows may be modified in other implementations. Further, non-dependent blocks and/or signal flows may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises" and/or "comprising," as used herein specify the presence of stated features, integers, steps or components but does not preclude the presence or addition of one or more other features, integers, steps, components or groups thereof. Further, the term "exemplary" (e.g., "exemplary embodiment," "exemplary configuration," etc.) means "as an example" (e.g., "an embodiment in an example," "a configuration in one example," etc.).

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    sending, from a management device through a network to a monitoring device, a request for a list of services provided by the monitoring device to other devices and for a list of network addresses associated with configuration settings for the services in the list of services;
    receiving, in the management device through the network from the monitoring device, the list of services and the list of network addresses associated with the services in the list of services;
    storing, in a memory in the management device, the list of services and the list of network addresses;
    receiving an event message in the management device through the network from the monitoring device, wherein the event message was generated by a service in the monitoring device listed in the list of services;
    displaying, to a user of the management device, the list of services provided by the monitoring device, including displaying an indication of the service that generated the event message;
    receiving, from the user of the management device, a selection of the service that generated the event message in the monitoring device from the list of services and determining a network address, in the received list of network addresses, associated with configuration settings for the selected service;
    requesting a resource identified by the network address, wherein the resource includes a web page hosted by a web server;
    displaying the web page to a user, wherein the web page is configured to enable the user to alter the configuration setting of the selected service that generated the event message; and
    transmitting the altered configuration setting to the web server, wherein the web server initiates an update of the configuration setting of the selected service based on the altered configuration setting.

2. The method of claim 1, wherein displaying the web page to the user includes:
    loading the web page through an intermediate server acting as a proxy device; and
    rendering the web page on a display of the management device.

3. The method of claim 1, wherein the monitoring device hosts the resource identified by the network address, the method further comprising:
    updating the configuration setting of the service based on the altered configuration setting through an application program interface (API) provided by the service on the monitoring device.

4. The method of claim 3, wherein the monitoring device does not host the resource identified by the network address, the method further comprising:
    updating the configuration setting of the service based on the altered configuration setting through an application program interface (API) provided by the service on the monitoring device.

5. The method of claim 4, wherein receiving the network address includes receiving, from the monitoring device in the management device, the list of services provided by the monitoring device and corresponding identification of event messages associated with one or more services in the list of services.

6. The method of claim 5, wherein displaying the web page to the user includes:

loading the web page through an intermediate server acting as a proxy device; and rendering the web page on a display of the management device.

7. The method of claim 1, wherein the monitoring device does not host the resource identified by the network address, the method further comprising:

updating the configuration setting of the service based on the altered configuration setting through an application program interface (API) provided by the service on the monitoring device.

8. The method of claim 1, wherein receiving the network address includes receiving, from the monitoring device in the management device, the list of services provided by the monitoring device and corresponding identification of event messages associated with one or more services in the list of services.

9. The method of claim 1, wherein the monitoring device is a camera and the service detects motion in a field of view of the camera.

10. The method of claim 1, wherein the monitoring device is a camera and the service counts people in a field of view of the camera.

11. A system comprising:

a management device comprising:

a transmitter to send, from the management device through a network to a monitoring device, a request for a list of services provided by the monitoring device to other devices and for a list of network addresses associated with configuration settings for the services in the list of services;

a receiver to receive in the management device through the network from the monitoring device, the list of services and the list of network addresses associated with the services in the list of services, and to receive an event message from the monitoring device, wherein the event message was generated by a service in the monitoring device listed in the list of services;

a memory to store the list of services and the list of network addresses;

a display to show the list of services provided by the monitoring device, including displaying an indication of the service that generated the event message; and an input device to receive a selection, from the list of services provided by the monitoring device, the service that generated the event message in the monitoring device, wherein the transmitter is further configured to request a resource identified by the network address, wherein the resource includes a web page hosted by a web server, and the display is configured to show the web page to a user, wherein the web page is configured to enable the user to alter the configuration setting of the service that generated the event message, wherein the transmitter is configured to send the altered configuration setting to the web server, and wherein the web server initiates an update of the configuration setting of the service based on the altered configuration setting.

12. The system of claim 11, further comprising:

a proxy device, wherein the management device is configured to load the web page through an intermediate server acting as a proxy device and render the web page on the display.

13. The system of claim 11, further comprising the monitoring device, wherein the monitoring device hosts the resource identified by the network address and sends the altered configuration setting to the monitoring device through an application program interface (API) provided by the service on the monitoring device.

14. The system of claim 13, further comprising a server, wherein the server hosts the resource identified by the network address and sends the altered configuration setting to the monitoring device through an application program interface (API) provided by the service on the monitoring device.

15. The system of claim 14, wherein the receiver is configured to receive, from the monitoring device in the management device, the list of services provided by the monitoring device and corresponding identification of event messages associated with one or more services in the list of services.

16. The system of claim 15, further comprising:

a proxy device, wherein the management device is configured to load the web page through an intermediate server acting as a proxy device and render the web page on the display.

17. The system of claim 11, further comprising a server, wherein the server hosts the resource identified by the network address and sends the altered configuration setting to the monitoring device through an application program interface (API) provided by the service on the monitoring device.

18. The system of claim 11, wherein the monitoring device is a camera and the service detects motion in a field of view of the camera.

19. The system of claim 11, wherein the monitoring device is a camera and the service counts people in a field of view of the camera.

20. The system of claim 11, wherein the receiver is configured to receive, from the monitoring device in the management device, the list of services provided by the monitoring device and corresponding identification of event messages associated with one or more services in the list of services.

* * * * *